(12) United States Patent
Balasubramanian et al.

(10) Patent No.: US 11,838,129 B2
(45) Date of Patent: Dec. 5, 2023

(54) HYBRID AUTOMATIC REPEAT REQUEST (HARQ) TECHNIQUES FOR NON-TERRESTRIAL NETWORKS

(71) Applicant: INTERDIGITAL PATENT HOLDINGS, INC., Wilmington, DE (US)

(72) Inventors: Anantharaman Balasubramanian, San Diego, CA (US); Nagi Mahalingam, San Diego, CA (US); Mihaela C. Beluri, Jericho, NY (US); Ravikumar V. Pragada, Warrington, PA (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

(21) Appl. No.: 17/044,987

(22) PCT Filed: Apr. 3, 2019

(86) PCT No.: PCT/US2019/025614
§ 371 (c)(1),
(2) Date: Oct. 2, 2020

(87) PCT Pub. No.: WO2019/195446
PCT Pub. Date: Oct. 10, 2019

(65) Prior Publication Data
US 2021/0167899 A1 Jun. 3, 2021

Related U.S. Application Data

(60) Provisional application No. 62/652,115, filed on Apr. 3, 2018.

(51) Int. Cl.
*H04L 1/1812* (2023.01)
*H04L 1/1822* (2023.01)
(Continued)

(52) U.S. Cl.
CPC .......... *H04L 1/1819* (2013.01); *H04L 1/1822* (2013.01); *H04L 1/1825* (2013.01);
(Continued)

(58) Field of Classification Search
CPC ... H04L 1/1819; H04L 1/1822; H04L 1/1825; H04L 1/1845; H04L 1/1864; H04L 1/1896
See application file for complete search history.

(56) References Cited

U.S. PATENT DOCUMENTS 9,503,224 B2   11/2016   Kim et al.
10,516,505 B2  12/2019   Berggren et al.
(Continued)

FOREIGN PATENT DOCUMENTS

WO   2010118590 A1   10/2010
WO   2017136678 A1   8/2017

OTHER PUBLICATIONS

Dahlman et al., *4G LTE-Advanced and the Road to 5G*, Third Edition, Elsevier (2016).
(Continued)

*Primary Examiner* — Jackie Zuniga Abad
(74) *Attorney, Agent, or Firm* — Volpe Koenig

(57) ABSTRACT

Methods and apparatuses are described herein for providing Hybrid Automatic Repeat Request (HARQ) techniques for a non-terrestrial network. For example, a wireless transmit/receive unit (WTRU) may transmit, to a satellite base station (BS), uplink (UL) feedback that includes configuration information for redundancy versions (RVs) and cross redundancy versions (cRVs). The WTRU may receive one or more first RVs associated with a first transport block (TB). The WTRU may receive one or more second RVs associated with a second TB and at least one cross redundancy version (cRV) associated with the first TB and second TB. The cRV
(Continued)

may include parity bits generated from both the first TB and second TB. If at least one of the first TB or the second TB is unsuccessfully decoded, the WTRU may decode the first TB and second TB jointly based on the at least one cRV.

14 Claims, 16 Drawing Sheets

(51) Int. Cl.
    *H04L 1/1825*          (2023.01)
    *H04L 1/1829*          (2023.01)
    *H04L 1/1867*          (2023.01)

(52) U.S. Cl.
    CPC .......... *H04L 1/1845* (2013.01); *H04L 1/1864* (2013.01); *H04L 1/1896* (2013.01)

(56) References Cited

U.S. PATENT DOCUMENTS

| | | | |
|---|---|---|---|
| 2003/0210133 A1 | 11/2003 | Amtmann | |
| 2012/0314655 A1 | 12/2012 | Xue et al. | |
| 2016/0277096 A1* | 9/2016 | Wu | H03M 13/258 |
| 2017/0214489 A1* | 7/2017 | Jiang | H04L 1/1883 |
| 2018/0123732 A1* | 5/2018 | Axmon | H04L 1/0033 |
| 2019/0229751 A1* | 7/2019 | Kim | H03M 13/1188 |
| 2019/0312679 A1* | 10/2019 | Jayasinghe | H04L 5/0053 |
| 2020/0067651 A1* | 2/2020 | Takeda | H04L 1/1896 |

OTHER PUBLICATIONS

Dish Network et al., "Satellite Aspects—Forward Compatibility Consideration," 3GPP TSG RAN WG1 Meeting #86 bis, R1-1609781 (Oct. 10-15, 2016).
Ericsson, "On HARQ for Ntn," 3GPP Tsg-Ran WG2 #104, R2-1817764, Spokane, US (Nov. 12-16, 2018).
Fraunhofer Iis et al., "NR-NTN: HARQ in Satellite Systems," 3GPP TSG-RAN WG2 Meeting #104, R2-1817757, Spokane, USA (Nov. 12-16, 2018).
Fraunhofer Iis et al., "NTN NR impacts on the HARQ Operation," 3GPP TSG RAN1 Working Group Meeting RAN1#92, R1-1802613, Athens, Greece (Feb. 26-Mar. 2, 2018).
Hagenauer, "The turbo principle-tutorial introduction and state of the art," International Symposium on Turbo Codes, France (1997).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
Interdigital Inc., "Considerations on HARQ Management for Non-Terrestrial Networks," 3GPP TSG RAN WG1 Meeting #92, R1-1802631, Athens, Greece (Feb. 26-Mar. 2, 2018).
Lin et al., *Error Control Coding: Fundamentals and Applications*, Prentice-Hall, Inc. (1983).
Thales et al., "Non-Terrestrial Networks: Considerations on NR impacts," 3GPP TSG RAN Meeting 77, RP-171579, Sapporo, Japan (Sep. 11-15, 2017).
Thales, "Motivation for a study on 5G to support non-terrestrial networks," 3GPP TSG RAN Meeting #75, RP-170133, Dubrovnik, Croatia (Mar. 6-9, 2017).
Thales, "Motivations to Study NR Support Non-Terrestrial Networks," 3GPP RAN #75, RP-170133, Dubrovnik, Croatia (Mar. 6-9, 2017).
Thales, "Propagation delay and Doppler in Non-Terrestrial Networks," 3GPP TSG RAN Meeting 76, RP-170982,West Palm Beach, USA (Jun. 5-9, 2017).
Third Generation Partnership Project, "Technical Specification Group Radio Access Network; Study on New Radio (NR) to support non terrestrial networks (Release 15)," 3GPP TR 38.811V0.2.1 (Nov. 2017).
Third Generation Partnership Project, "Technical Specification Group Radio Access Network; Study on New Radio (NR) to support non terrestrial networks (Release 15)," 3GPP TR 38.811 V15.0.0 (Jun. 2018).
Third Generation Partnership Project, "Technical Specification Group Radio Access Network; Study on New Radio (NR) to support non terrestrial networks (Release 15)," 3GPP TR 38.811 V0.3.0 (Dec. 2017).
Third Generation Partnership Project, "Technical Specification Group Radio Access Network; NR; Multiplexing and channel coding (Release 15)," 3GPP TS 38.212 V15.0.0 (Dec. 2017).
Third Generation Partnership Project, "Technical Specification Group Radio Access Network; NR; Multiplexing and channel coding (Release 15)," 3GPP TS 38.212 V15.5.0 (Mar. 2019).
Third Generation Partnership Project, "Technical Specification Group Radio Access Network; NR; Medium Access Control (MAC) protocol specification (Release 15)," 3GPP TS 38.321 V15.2.0 (Jun. 2018).
Third Generation Partnership Project, "Technical Specification Group Radio Access Network; NR; Medium Access Control (MAC) protocol specification (Release 15)," 3GPP TS 38.321 V15.4.0 (Dec. 2018).
Third Generation Partnership Project, "Technical Specification Group Radio Access Network; Evolved Universal Terrestrial Radio Access (E-UTRA); Multiplexing and channel coding (Release 14)," 3GPP TS 36.212 V14.2.0 (Mar. 2017).
Third Generation Partnership Project, "Technical Specification Group Radio Access Network; Evolved Universal Terrestrial Radio Access (E-UTRA); Multiplexing and channel coding (Release 15)," 3GPP TS 36.212 V15.1.0 (Mar. 2018).
Third Generation Partnership Project, "Technical Specification Group Radio Access Network; Evolved Universal Terrestrial Radio Access (E-UTRA); Multiplexing and channel coding (Release 15)," 3GPP TS 36.212 V15.5.0 (Mar. 2019).
Mediatek Inc., "On multiple HARQ bits per TB and feedback mechanism," 3GPP TSG RAN WG1 Meeting #88, R1-1702738, Athens, Greece (Feb. 13-17, 2017).
TSG RAN WG1, "Further LTE Physical Layer Enhancements for MTC," 3GPP TSG RAN meeting #70, RP-151672, Sitges, Spain (Dec. 7-10, 2015).
Zhi, "LTE-A system relay Research on HARQ technology," China Master Thesis Electronic Journal Network (Mar. 15, 2018).

\* cited by examiner

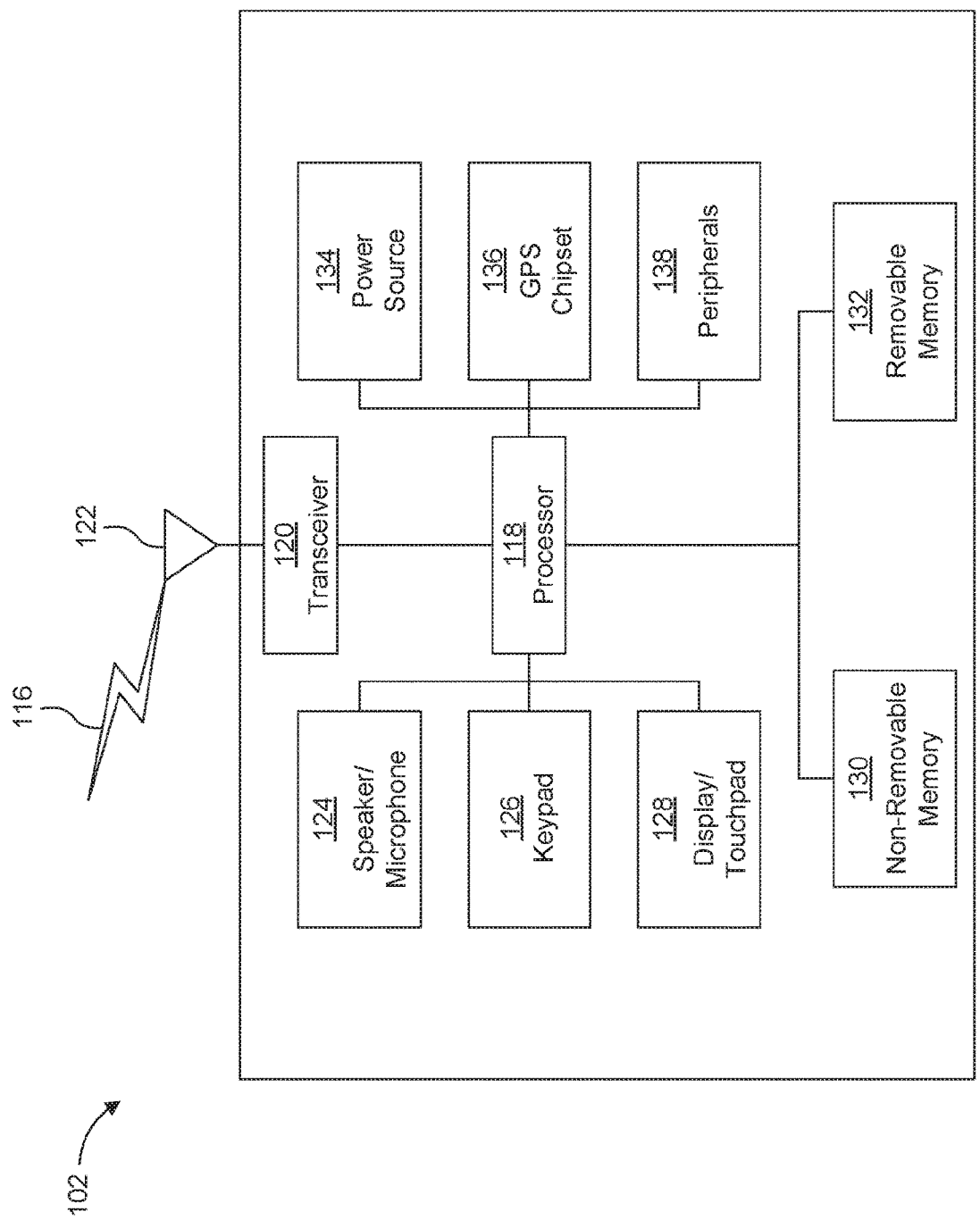

HYBRID AUTOMATIC REPEAT REQUEST (HARQ) TECHNIQUES FOR NON-TERRESTRIAL NETWORKS

CROSS REFERENCE TO RELATED APPLICATIONS

This application is the U.S. National Stage, under 35 U.S.C. § 371, of International Application No. PCT/US2019/025614 filed Apr. 3, 2019, which claims the benefit of U.S. Provisional Application No. 62/652,115, filed Apr. 3, 2018, the contents of which are hereby incorporated by reference herein.

BACKGROUND

In terrestrial networks such as New Radio (NR), Long Term Evolution (LTE), or Wideband Code Division Multiple Access (WCDMA), the propagation delay is negligible due to the fact that the distance that a radio frequency (RF) signal has to traverse between a wireless transmit/receive unit (WTRU) and a base station (BS) is at most a few tens of kilometers. For example, the propagation delays for LTE systems can be approximately nanoseconds or microseconds depending on the distance. Typically, the maximum number of Hybrid Automatic Repeat Request (HARQ) retransmissions (including the original transmission) is set at four for LTE systems, which means that in the worst case, the delay for a successful decode can be tolerated by most applications of interest. However, in non-terrestrial networks (NTNs), the propagation delay is not negligible. Typical propagation delays for Geostationary Equatorial Orbit (GEO), Medium Earth Orbit (MEO), and Low Earth Orbit (LEO) systems can be up to 135 ms, 45 ms, and 10 ms, respectively. In case of using HARQ for NTNs, the delay taking into account the maximum number of retransmissions may become prohibitively large for most applications. Furthermore, due to the large propagation delay, channel state information (CSI), irrespective of how frequent the channel is estimated and fed back, may become stale by the time the transmitter receives the feedback from the receiver. In case of HARQ, these issues may lead to increase in latencies for decoding a transport block (TB). Thus, methods and apparatuses that optimize resource usage for HARQ stop-and-wait procedure over an NTN link are needed.

SUMMARY

Methods and apparatuses are described herein for providing Hybrid Automatic Repeat Request (HARQ) techniques for non-terrestrial networks. For example, a wireless transmit/receive unit (WTRU) may transmit, to a base station (BS), uplink (UL) feedback that includes configuration information for one or more redundancy versions (RVs) and one or more cross redundancy versions (cRVs). The configuration information may include a bitmap indicating at least one of a number of RVs per a bundle, an RV index, a code block group (CBG) index, transmission time interval (TTI) mapping information, or cRV signaling information indicating one or moreTBs across which at least one cRV is to be generated. The WTRU may receive, from the BS, first downlink control information (DCI) indicating that one or more first RVs are configured for a first transport block (TB). The WTRU may receive, from the BS, the one or more first RVs associated with a first TB and decode, based on the one or more first RVs, the first TB. If of the first TB using the one or more first RVs is unsuccessfully decoded, the WTRU may generate a first estimated TB that includes estimated information bits for the first TB. The WTRU may receive, from the BS, second DCI indicating that one or more second RVs and at least one cRV are configured for the second TB. The WTRU may receive, from the BS, the one or more second RVs associated with a second TB and the at least one cRV associated with the first TB and second TB. The at least one cRV may include a plurality of information and/or parity bits generated across the first TB and second TB. The WTRU may then decode, based on the one or more second RVs, the second TB. If the second TB using the one or more second RVs is unsuccessfully decoded, the WTRU may generate a second estimated TB that includes estimated information bits for the second TB. If at least one of the first TB or the second TB is unsuccessfully decoded, the WTRU may decode the first TB and second TB jointly based on the at least one cRV. Specifically, if at least one of the first estimated TB or the second estimated TB is generated, the WTRU may perform at least one of: (1) concatenating the first estimated TB and the second TB; (2) concatenating the first TB and the second estimated TB; or (3) concatenating the first estimated TB and the second estimated TB, in order to generate a concatenated TB. Once the concatenated TB is generated, the WTRU may decode the concatenated TB based on the at least one cRV. If the concatenated TB is successfully decoded, the WTRU may transmit positive HARQ feedback to the BS. If the concatenated TB is unsuccessfully decoded, the WTRU may transmit negative HARQ feedback to the BS.

BRIEF DESCRIPTION OF THE DRAWINGS

A more detailed understanding may be had from the following description, given by way of example in conjunction with the accompanying drawings wherein:

FIG. 1B is a system diagram illustrating an example wireless transmit/receive unit (WTRU) that may be used within the communications system illustrated in FIG. 1A according to an embodiment;

DESCRIPTION

Figure 1A:
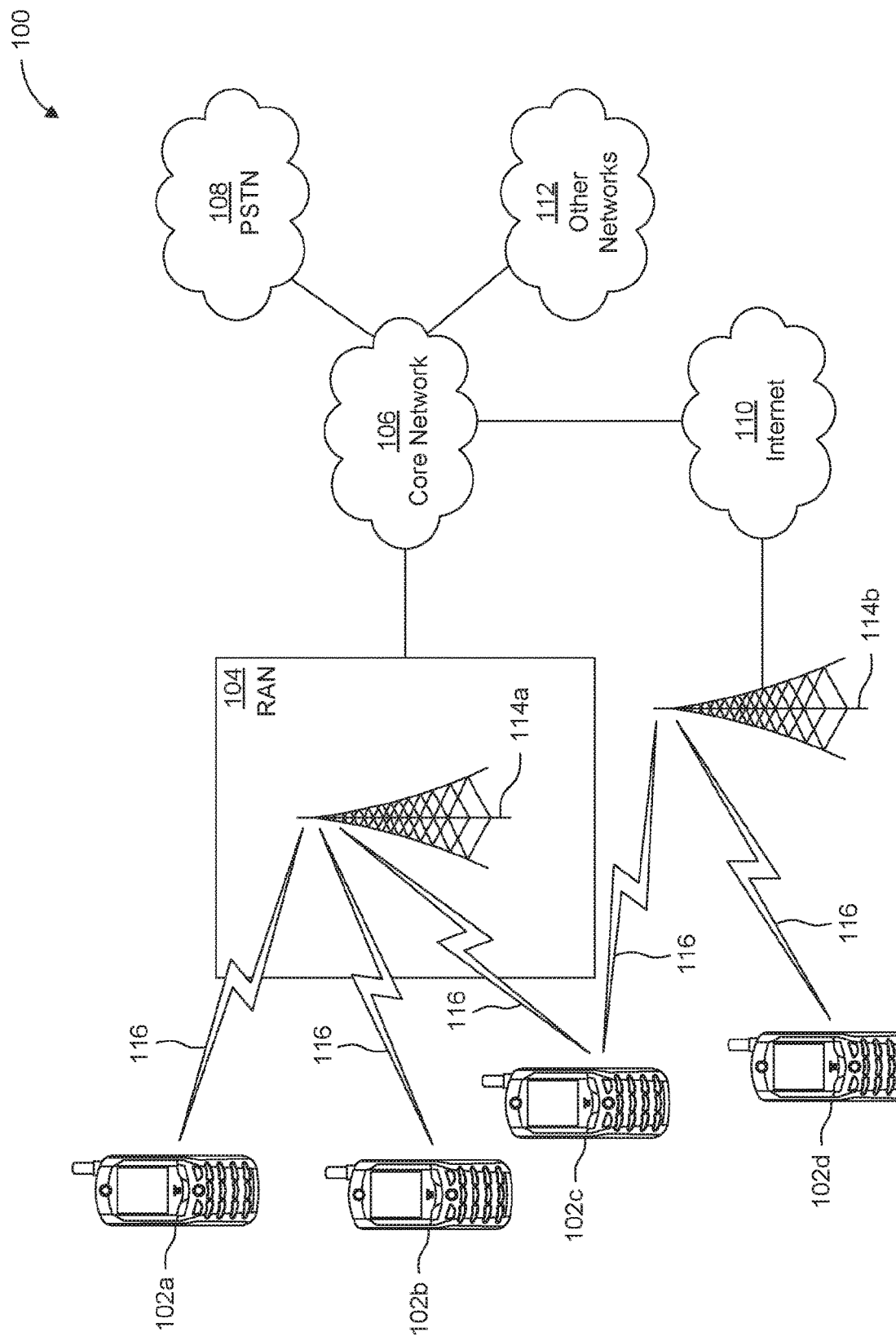
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 10:
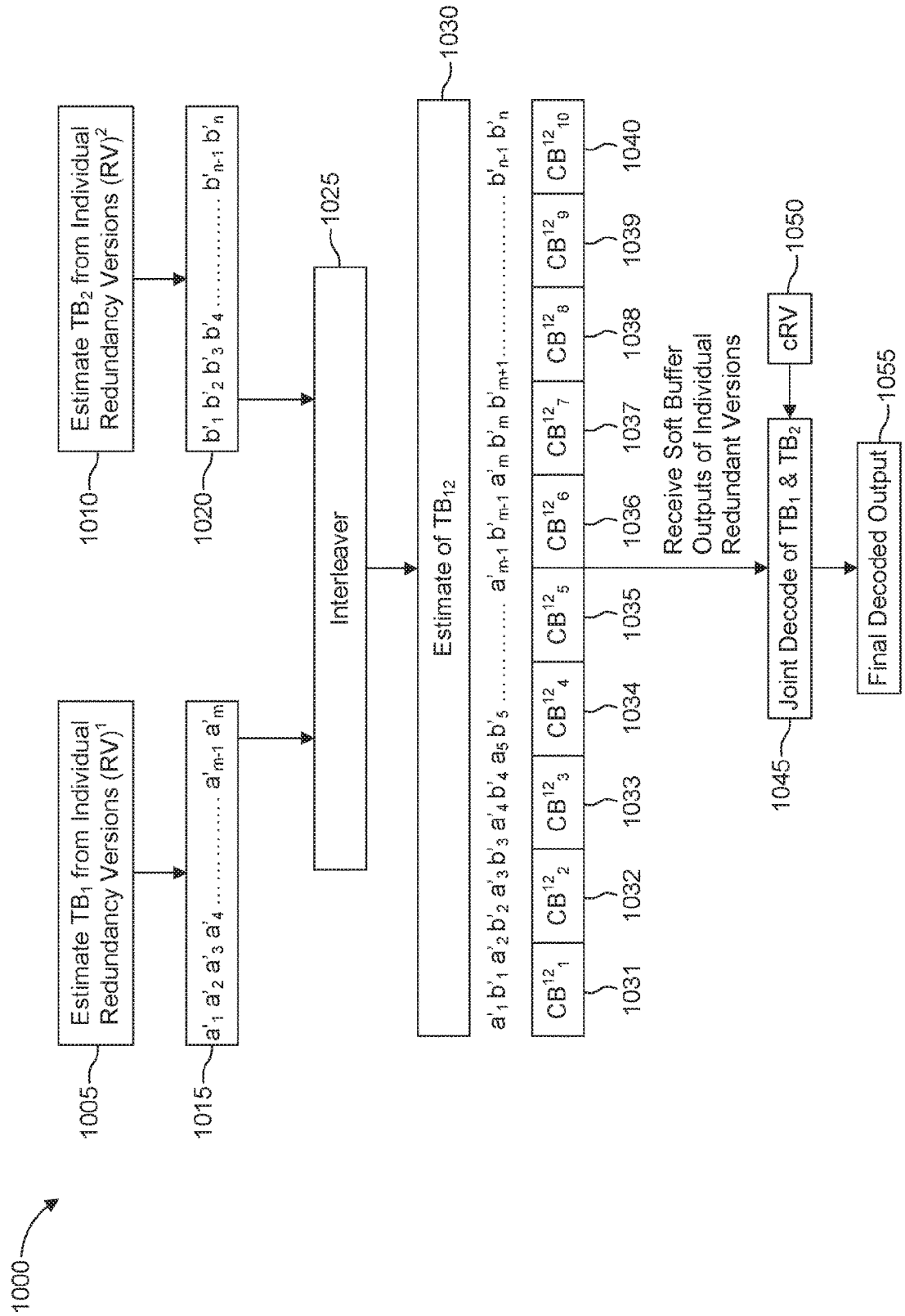
FIG. 10 is a diagram illustrating an example decoding procedure using a cRV generated across multiple TBs.

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Figure 1C:
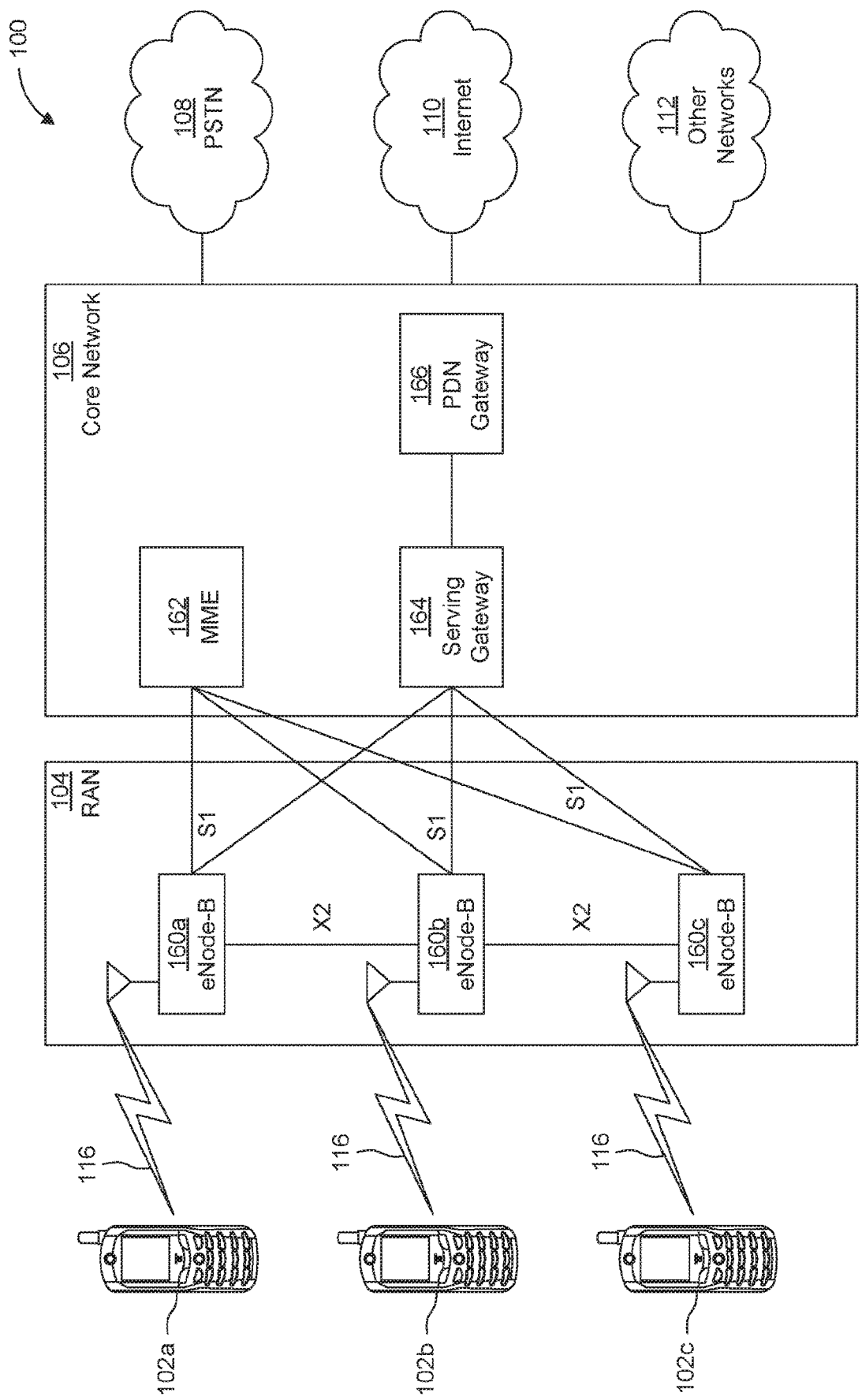
FIG. 1C is a system diagram illustrating an example radio access network (RAN) and an example core network (CN) that may be used within the communications system illustrated in FIG. 1A according to an embodiment.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
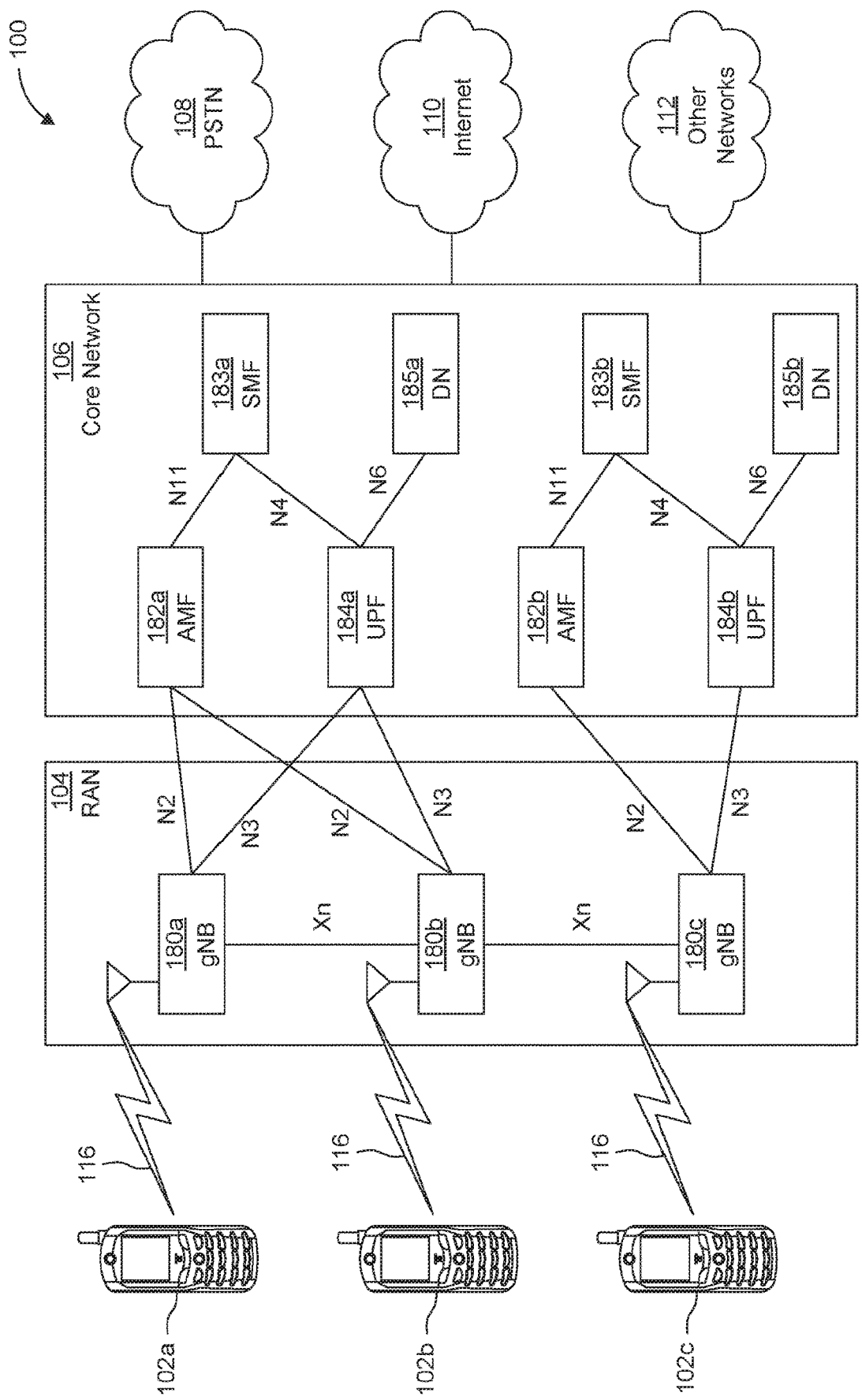
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a*-*d*, Base Station 114*a*-*b*, eNode-B 160*a*-*c*, MME 162, SGW 164, PGW 166, gNB 180*a*-*c*, AMF 182*a*-*ab*, UPF 184*a*-*b*, SMF 183*a*-*b*, DN 185*a*-*b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Hybrid Automatic Repeat Request (HARQ) protocols have been used since 3G systems. HARQ provides physical layer/medium access control (PHY/MAC) level error correction mechanism by repeating transmission of same/different sets of information/parity bits in addition to performing forward error correction (FEC). There are three types of HARQ protocols: chase combining and incremental redundancy (Type II and Type III).

In chase combining scheme, the same set of coded data is retransmitted, and the decoder combines multiple coded packets before the decoding operation. Combining multiple similarly coded packets yields an effective power gain, thus enhancing the probability of decoding.

In Type II HARQ of incremental redundancy scheme, additional parity information bits are transmitted in each re-transmission. Every re-transmission may not be decodable by itself, but can be jointly decoded by considering several previously performed re-transmissions containing different redundant versions (RVs). In Type III HARQ of incremental redundancy scheme, each retransmission is self-decodable. That is, the same information bits are sent with different sets of parity bits during each retransmission.

HARQ provides instantaneous feedback (subject to the timing considerations that depends on the hardware constraints, propagation delay, etc.,) on the decodabiity of transmitted codeword(s). This enables expedited feedback from the MAC layer instead of having to rely on the upper layers (e.g., radio link control (RLC) layer) to trigger an ARQ request in case of erroneous transmissions. Furthermore, HARQ feedback can be thought of providing one bit feedback of the latest channel state information, in addition to the channel quality indicator (CQI) feedback that is performed periodically/coarsely once in a configured time interval.

The primary disadvantage of performing a feedback every codeword is the delay incurred in sending the associated transport block (TB), as the transmitter needs to stop and wait (SAW) for a positive acknowledgement/negative acknowledgement (ACK/NACK) before it can send new TBs. If a NACK is received, the transmitter may re-transmit the codeword corresponding to the NACKed transport block. In order to enhance spectral efficiency, LTE introduced the concept of multiple HARQ process per HARQ entity. Here, each HARQ process runs independently enabling multiple TBs (i.e., SAW processes) to be run concurrently per HARQ entity. The maximum number of HARQ processes that can be run concurrently is proportional to round trip time, and hardware processing delays incurred, where the latter becomes negligible compared to the former for non-terrestrial network (NTNs).

Figure 2:
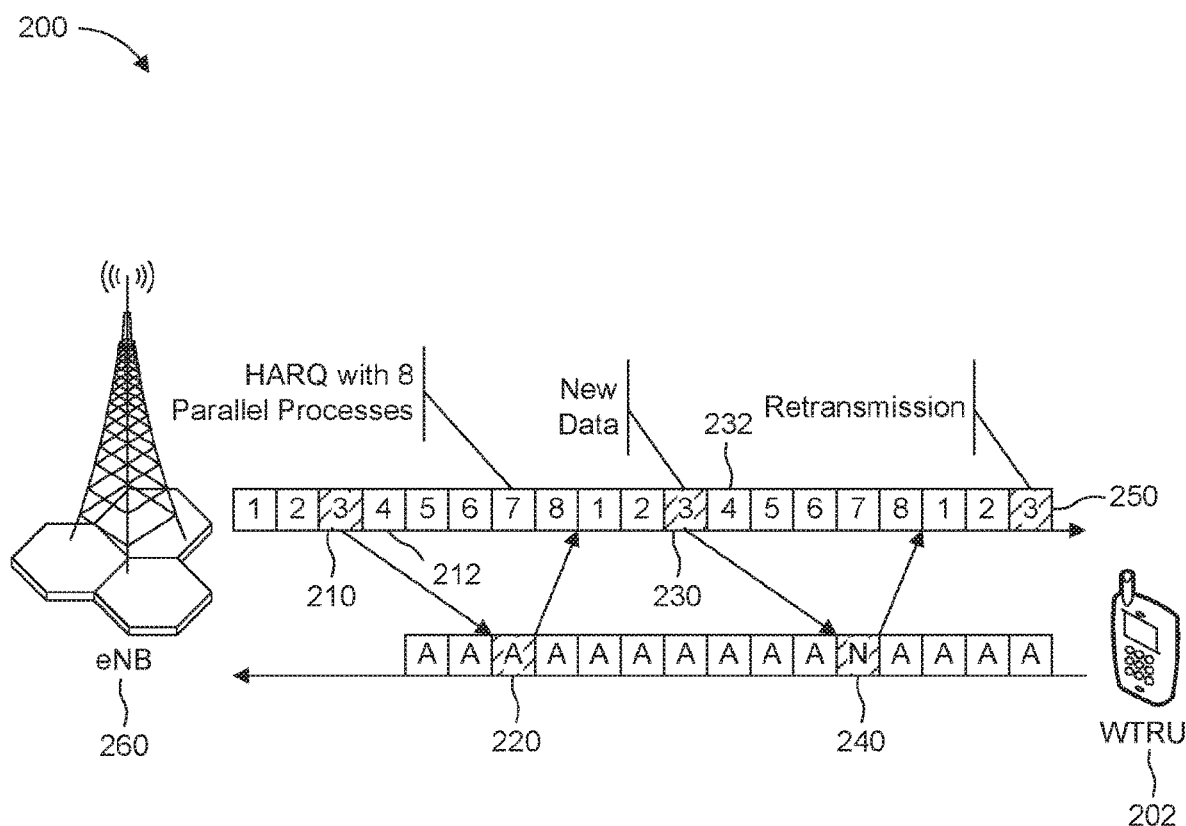
FIG. 2 is a diagram illustrating an example multiple Hybrid Automatic Repeat Request (HARQ) process per HARQ entity.

FIG. 2 illustrates an example multiple parallel HARQ processes per HARQ entity 200. As illustrated in FIG. 2, multiple stop and wait (SAW) processes may be applied to the eNB 260 and the WTRU 202. For example, the eNB 260 can transmit another HARQ process while waiting for ACK from one process. While processing the data (e.g., TB) received in the first HARQ process, the WTRU 202 can continue to receive another data using the second process and so on. The multiple HARQ processes operating in parallel may form one HARQ entity. Specifically, the eNB 260 may transmit TB4 212 to the WTRU 202 while waiting for HARQ feedback (i.e. in this case, ACK 220) for the previous transmission of TB3 210 from TB3 HARQ processing. After the completion of any of the HARQ processes, the WTRU 202 can continue to receive TB4 232 (i.e. new data) from the eNB 260 and initiate another HARQ processing for TB4 232 while performing the HARQ processing for TB3 230 (in this example, NACK 240). After the HARQ processing for TB3 230 is initiated, the WTRU 202 makes an attempt to decode TB3 230. If TB3 230 is not correctly decoded, the WTRU 202 may inform the eNB 260 NACK 240. Upon receiving the NACK 240, the eNB 260 may retransmit TB3 250 to the WTRU 202. These multiple HARQ processes (e.g., HARQ processes for TB1-TB8) operating in parallel to form one HARQ entity, combines the simplicity of a SAW protocol while still allowing continuous transmission of data.

For frequency division duplex (FDD) systems in LTE, the maximum number of HARQ processes that can be supported is fixed at eight. The number of HARQ processes for time division duplex (TDD) is related to the frame configuration and varies between 4 and 15. There are two types of HARQ procedures, namely: asynchronous and synchronous. In the asynchronous HARQ procedure used in LTE downlink, the HARQ process number and the redundancy version (RV) are explicitly indicated in the downlink control information (DCI). In the synchronous HARQ procedure used in uplink, the WTRU uses HARQ process number based on the subframe number, and hence the eNB can decipher the HARQ process number implicitly. For example, HARQ process number corresponding to subframe i, could be (i mod 8), for implicit determination by the eNB. The RV transmitted in a subframe for a synchronous HARQ process could be pre-determined (i.e. non-adaptive) or can be signaled by the eNB in DCI 0 (adaptive).

Figure 3:
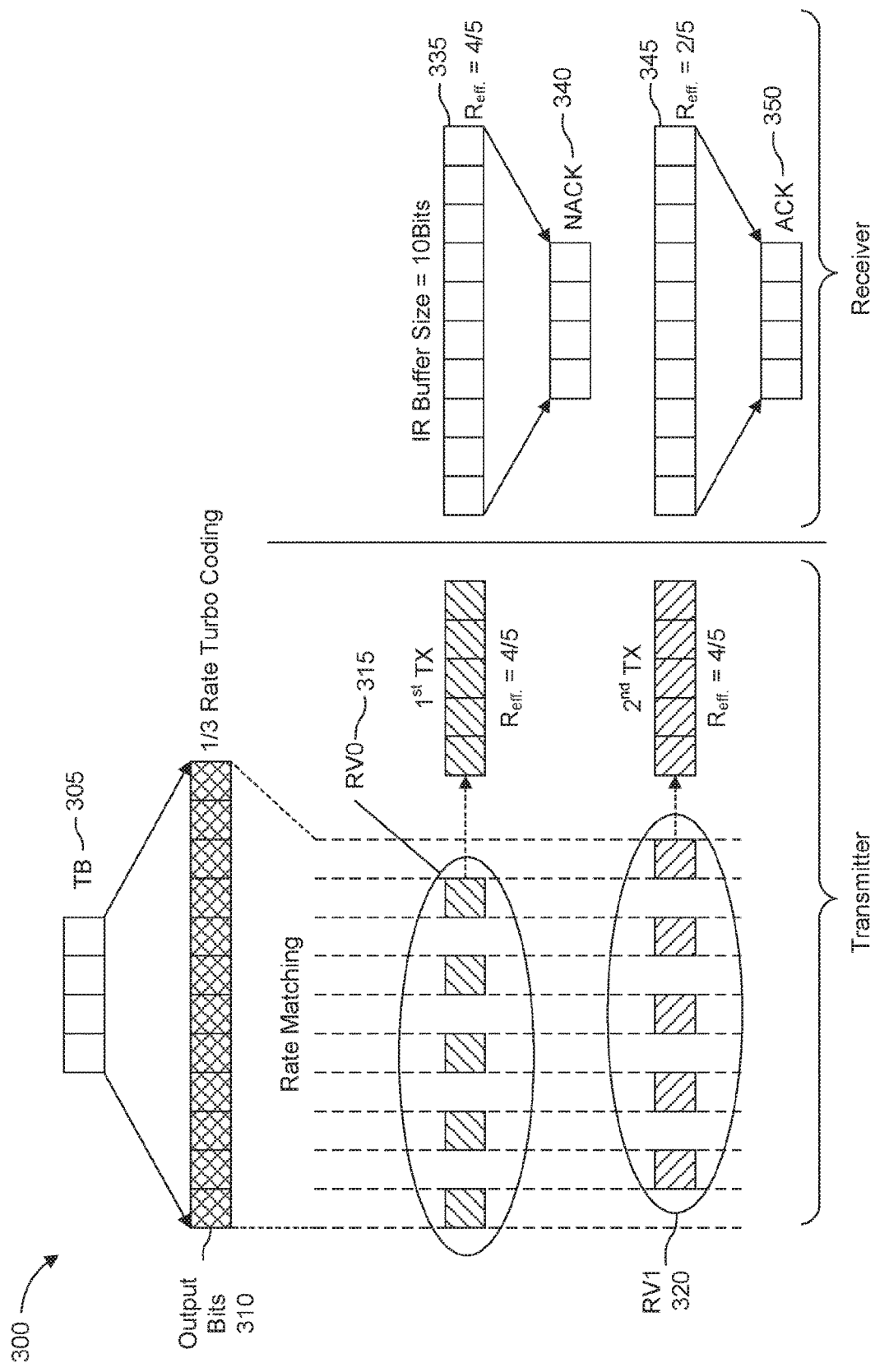
FIG. 3 is a diagram illustrating example generation of redundancy versions (RVs) and Hybrid Automatic Repeat Request (HARQ) feedbacks based on the RVs.

FIG. 3 illustrates example generation 300 of redundancy versions (RVs) and Hybrid Automatic Repeat Request (HARQ) feedbacks based on the RVs, which may be used in any combination of other embodiments described herein. As illustrated in FIG. 3, at the transmitters side, the transport block (TB) 305 obtained by the PHY may include original data with code redundancy check (CRC) bits. The TB 305 may be segmented into multiple code blocks and encoded using a turbo encoder or other channel coding schemes. For example, ⅓ rate turbo coding may be applied to the multiple code blocks to generate the output bits 310. The output bits 310 may include systematic bits and multiple parity bits (e.g., first and second parity bits) where the systematic bits, first parity and second parity bits are separately interleaved.

The interleaved bits may be inserted into a circular buffer with systematic bits inserted first, followed by alternating insertions of first and second parity bits. The subsets of interleaved bits may be selected from the circular buffer based on redundancy versions (RVs). RV-0 (redundancy version-0) 315 may represent more or less the systematic bits, while RV-1 320, RV-2, RV-3 may represent mostly the parity bits. The transmitter may first transmit the RV0 315 at the effective coding rate ⅘ to the receiver. If the transmitter receives the NACK 340 from the receiver, the transmitter may then transmit RV1 320 to the receiver. At the receiver's side, the receiver may receive the RV0 315 and decode the RV0 315 to obtain the original data (or actual data). If the receiver fails to decode, the receiver may generate NACK feedback 340 and transmit to the transmitter as the HARQ feedback. The receiver may then receive the RV1 320 from the transmitter and decode RV0 315 and RV1 320 together to obtain the original date (i.e. TB 305). If the receiver successfully decodes, then the receiver may transmit ACK 350 to the transmitter. In LTE, the rate matching and hybrid ARQ functionality may operate on all code blocks, and an ACK/NACK may be sent on the TB, and not on code blocks.

Figure 4:
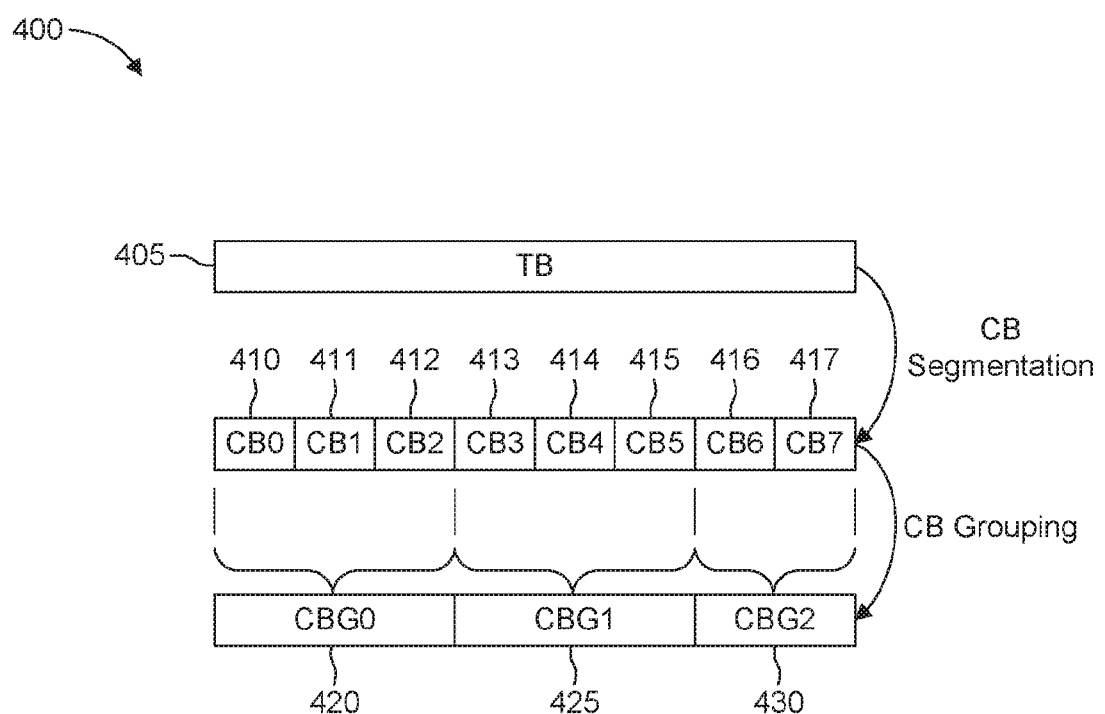
FIG. 4 is a diagram illustrating example transport block (TB) segmentation based on code block groups (CBGs)

FIG. 4 illustrates example transport block segmentation 400 based on code block/code block group (CBG), which may be used in any combination of other embodiments described herein. In case of New Radio (NR), or other fifth generation (5G) networks, the TB 405 obtained by the PHY may be segmented into code blocks 410, 411, 412, 413, 414, 415, 416, 417, similar to LTE. As illustrated in FIG. 4, the TB 405 may include CB0 410, CB1 411, CB2 412, CB3 413, CB4 414, CB5 415, CB6 416, CB7 417. Furthermore, NR supports the concept of CBGs 420, 425, 430 that represent multiple code blocks 410, 411, 412, 413, 414, 415, 416, 417, as shown in FIG. 4. For example, CBG0 420 may include CB0 410, CB1 411, CB2 412, CBG1 425 may include CB3 413, CB4 414, CB5 415, and CBG3 430 may include CB6 416 and CB7 417. HARQ feedback in NR may support reporting ACK/NACK per CBG. This enables the transmitter to re-transmit the RV corresponding only to those CBG (or code blocks that belong to this CBG), instead of having to retransmit the RV corresponding to the entire TB.

In terrestrial systems (e.g., NR, LTE, WCDMA, and other cellular or wireless systems, line WLAN), the propagation delay is negligible (e.g., on the order of nano/micro seconds) due to the fact that the worst case distance that an RF signal may have to traverse is between the WTRU at cell edge and the base station, which at most may be a few tens of kilometers. Typically, the maximum number of HARQ retransmissions (including the original transmission) is set at four for LTE systems, which means that the worst case delay for a successful decode (which in this example is eight times the one-way propagation delay) can be tolerated by most applications of interest. However, in the case of non-terrestrial network (NTN) systems, the propagation delay is not negligible. Typical propagation delays for Geostationary Equatorial Orbit (GEO), Medium Earth Orbit (MEO), and Low Earth Orbit (LEO) systems are respectively ~135 ms, ~45 ms, and ~10 ms. In the case of bent pipe communications, the propagation delays would be twice the numbers quoted above. Furthermore, the worst case delay taking into account the maximum number of retransmissions in the case of using HARQ for NTN becomes prohibitive for most applications. It is clear that deploying conventional HARQ schemes to NTN will incur significant delays.

Another significant issue due to large propagation delays, is the problem with channel estimation. Irrespective of how frequent the channel is estimated and fed back, the channel state indicator (CSI) becomes stale by the time the transmitter receives the feedback if channel coherence time is smaller than propagation time. Hence, adaptation of modulation/coding scheme based on CSI becomes largely ineffective. Thus, transmissions have to be performed almost blind/semi-blind. Though large scale fading effects can be estimated (that depends on the distance), it may not always be possible to estimate the small scale fading effects.

To summarize, large propagation delays present in NTN leads to the following problems: HARQ round trip time (RTT) where a feedback is provided on every transmitted redundancy version (RV) incurs large delay overhead, and due to the stale CSI, adapting the modulation/coding based on CSI is analogous to performing blind adaptation and amounts to not making use of the CSI information.

The embodiments described herein are provided for any type of wireless networks including terrestrial and non-terrestrial networks. The types of wireless networks may include, but are not limited to, Wireless Personal Area Network (WPAN), Wireless Local Area Network (WLAN), Warless Ad Hoc Network, Warless Metropolitan Area Network (WMAN), Wireless Wide Area Network (WAN), Cellular Network such as LTE and NR, Global Area Network (GAN), and Space Network. The term non-terrestrial network may refer to networks, or segments of networks, using an airborne or space-borne vehicle to embark a transmission/reception equipment relay node or base station. Space-borne vehicles may refer to satellites or satellites base stations including Low Earth Orbiting (LEO) satellites, Medium Earth Orbiting (MEO) satellites, Geostationary Earth Orbiting (GEO) satellites as well as Highly Elliptical Orbiting (HEO) satellites. Airborne vehicles may refer to High Altitude Platforms (HAPs) encompassing Unmanned Aircraft Systems (UAS)—including tethered UAS, Lighter than Air UAS and Heavier than Air UAS—all operating at altitude; typically between 8 and 50 km, quasi-stationary.

Embodiments for a dynamic HARQ bundling scheme where the bundle size is adapted per transmission based on coarse feedback is disclosed herein. The term bundling may refer to transmitting more than one redundancy versions in one or more transmit time intervals (TTIs). Embodiments for cross redundancy version (cRV) for providing redundancy versions across transport blocks are also disclosed herein. Furthermore, embodiments providing more information in the NACK feedback are disclosed herein. The information in the NACK feedback will help the transmitter to choose the right coded bits/redundancy version(s) to transmit, to enhance the chances of successful decoding. The term redundancy version (RV) may be defined as a set of information bits/parity bits that are needed to decode code block (CB), code block group (CBG), transport block (TB), or the like. One or more RVs for a TB may be generated soleley based on the TB under consideration. The term cross redundancy version (cRV) is defined as a set of information bits/parity bits that were generated from/between/across multiple CBs, CBGs, or TBs. Specifically, the cRV may be punctured from/between/across one or more RVs generated from multiple CBs, CBGs, or TBs.

Embodiments for dynamic HARQ bundling scheme are described herein. LTE systems allow TTI bundling on the uplink for certain applications where the WTRU bundles all RVs of a TB, and transmits them in separate TTIs. The feedback for the bundle is sent after the transmission of all the RVs. TTI bundling is typically enabled on demand by the eNB for a WTRU that it deems to be at cell edge and specifically for low-rate applications such as VoLTE. However, there is a possibility that some of the RV transmissions may be considered redundant and not be used for decoding. For example, if the channel is good, it may be sufficient to have RV-0 (i.e. systematic bits) and RV-2 (i.e. parity) to be able to decode the codeword. Thus, transmitting all the RVs (e.g., RV-0, RV-2, RV-3, RV-1) may lead to inefficient resource utilization in the sense that transmission of RV-3, RV-1 was not needed for decoding the systematic bits in this example.

The adaptive (or dynamic) RV bundling scheme may address these inefficient resource utilization. For example, the number of RV bundles transmitted in a TTI may be adaptive and may be applied to downlink as well as uplink of the NTN link. Based on a (coarse or uplink) feedback, the number of RV-bundles that are transmitted in a TTI may be varied. For example, if the channel is estimated to be poor, all the RV bundles may be transmitted in the current TTI, while if the channel is estimated to be good, then only fewer RVs, for example RV0, may be transmitted. The feedback (or uplink/slow feedback) may indicate one or more of the following.

Statistical information such as the channel statistics experienced over the last reporting period. The reporting period is quasi static and can be changed by the BS (e.g., eNB) based on statistical reasoning. This may include the percentage of times the channel exceeding/within preconfigured thresholds, for example:

CSI<THR1
THR2≤CSI≤THR3
CSI≥THR4

The percentage of times decoding was successful/unsuccessful with different combinations of the RVs used. For example, assuming that four RVs (RV-0, RV-1, RV-2. RV-3) are used, the combination may include:

RV-0
RV-0, RV-2
RV-0, RV-3
RV-0, RV-1
RV-0, RV-2, RV-3
RV-0, RV-2, RV-1
RV-0, RV-2, RV-3
RV-0, RV-2, RV-3, RV-1

Based on the feedback obtained, the transmitter may adapt the number of the RVs per bundle and the RV indices that need to be sent either in a single TTI or across multiple TTIs. For example, a bitmap may represent the number of RV, RV, and the TTI relationship that needs to be used to transmit them. The following Table 1 is an example of a bitmap:

TABLE 1

| Bitmap | Num RVs | RVs | TTI map |
|---|---|---|---|
| xxx00 | 2 | RV0, RV2 | n |
| xxx01 | 2 | RV0, RV3 | (n, n + 1) |
| xxx10 | 3 | RV0, RV2, RV3 | (n, n + 1) |
| xxx11 | 3 | RV0, RV2, RV1 | (n, n + 1, n + 4) |
| ... | ... | ... | ... |

In Table 1, character 'x' of the bitmap may be either a bit 1 or bit 0. Only the last 2 bits of the bitmap are detailed in this example. As discrete examples from Table 1, the bitmap equal to 'xxx00' corresponds to both RV0 and RV2 transmitted in the same TTI-n, while the bitmap of 'xxx01' corresponds to RV0 and RV3 transmitted in consecutive TTIs n and n+1 respectively. Similarly, the bitmap 'xxx10' indicates two RVs, RV0 and RV2, transmitted in nth TTI, while RV3 is transmitted in $(n+1)^{th}$ TTI. When RVs are to be transmitted on different TTIs, the TTIs need not be consecutive and the TTI pattern is inferred by the bitmap. The feedback from the receiver may indicate the example bitmap in Table 1 that the transmitter should be using for subsequent transmission.

In the case of NR, where a CBG concept applies, when CBG count equals 1, the feedback discussed above for the LTE case may apply. For example, when CBG count equals 1, all code blocks of a transport block are part of the same CBG. When CBG count is greater than 1, the feedback discussed above for LTE may be modified. The percentage of times decoding was successful/unsuccessful with different combinations of RVs used can be calculated for all the CBGs combined, or per CBG, or subgroups of CBGs. For example, if the number of CBGs configured is three, the statistics may be provided for $CBG_1$, $CBG_2$, $CBG_3$ individually, or all of them combined, or subgroups of ($CBG_1$, $CBG_2$), and $CBG_3$. Based on the feedback obtained, the transmitter may adapt the number of the RVs for CBG and the actual RVs that need to be sent for a CBG either in a single TTI or across multiple TTIs. An example is shown in Table 2. Alternately or additionally, the feedback from the receiver may simply indicate the bitmap in Table 2 that the transmitter should be using for subsequent transmission.

TABLE 2

| Bit map | Num RVs | RVs/CBG | TTI map |
|---|---|---|---|
| xxx00 | 2 | RV0 of all CBGs<br>RV1 of $CBG_1$, $CBG_3$ | n |
| xxx01 | 2 | RV0 all CBGs (TTI: n)<br>RV3 of all CBGs (TTI: n + 3) | (n, n + 3) |
| xxx10 | 3 | RV0 of all CBGs (TTI: n)<br>RV2 of $CBG_1$ (TTI: n + 1)<br>RV3 of $CBG_2$, $CBG_3$ (TTI: n + 1) | (n, n + 1) |
| xxx11 | 3 | RV0 of all CBGs (TTI: n)<br>RV2 of all CBGs(TT: n + 1)<br>RV1 of $CBG_3$ (TTI: n + 5) | (n, n + 1, n + 5) |
| ... | ... | ... | ... |

The number of bundles to be transmitted on HARQ feedback may be adaptive, and may vary with the channel statistics reported or estimated. The HARQ feedback may be provided as a summary, periodically over a configured time period or aperiodically on demand, and need not be on a per TTI basis or per TB basis. The feedback may provide channel statistics over the configured time period (as described above), and need not be the latest/current channel realization.

In the case of uplink, the WTRU may send over physical uplink shared channel (PUSCH) a 'slow rate' feedback summary on the channel statistics experienced (described above) over the last configured time period, or aperiodically on demand. The WTRU may also transmit the feedback instantaneously over physical uplink control channel (PUCCH). Based on the feedback, the number of bundles that are used by the BS (e.g., eNB) for every TB, throughout the next bundled transmission time period, $_{BundlePeriod}$ (e.g., next, $T_{BundlePeriod}$>1 TTIs), is signaled explicitly to the WTRU through DCI, MAC-CE or RRC layer parameter such as 'adaptive bundle size=x', based on a bitmap as shown in Table or Table 2. $T_{BundlePeriod}$ is semi-static and may be changed by the gNB eNB.

Alternately or additionally, the WTRU may signal directly the bitmap on a dedicated resource in PUCCH that the BS (e.g., eNB) needs to follow. An RRC identifier, adaptive bundling=True can be configured to indicate that both the WTRU and BS (e.g., eNB) do not have to provide a HARQ feedback per TB/CBG as in the conventional case. Further, there may be an implicit way of letting the BS (e.g., eNB) know the RV that the WTRU is transmitting. In LTE, for a HARQ process, if one RV is transmitted per TTI, the RV transmitted in the kth subframe may be given by (k mod x), where x is the number of RVs (which is 4 in LTE).

In the case of downlink, the BS (e.g., eNB) may directly signal the bitmap on DCI, MAC-CE or RRC layer in the bundle parameters that the WTRU needs to use.

Alternatively or additionally, multiple RVs may be transmitted per TTI sufficiently spaced apart in subcarrier/PRB allocations so as to leverage frequency diversity. The number of RVs, and the PRB allocations may be signaled via DCI, MAC-CE, RRC. This is applicable for both uplink and downlink scenarios.

Figure 5A:
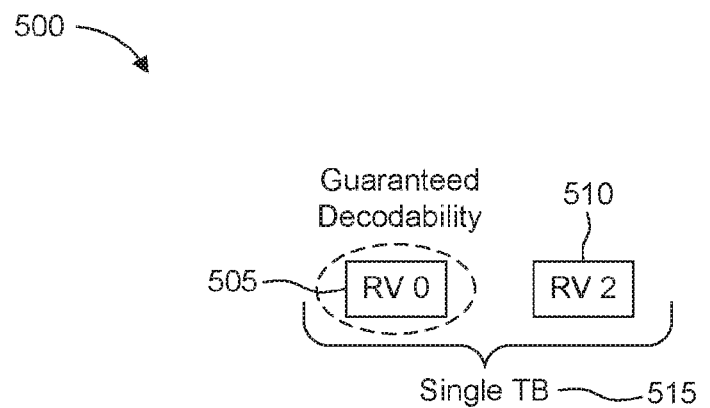
FIG. 5A is a diagram illustrating an example transmission of a TB that includes RVs for decoding.

FIG. 5A illustrates an example transmission 500 of a transport block (TB) that includes an redundancy versions (RV) for decoding, which may be used in any combination of other embodiments described herein. As mentioned previously, if the channel is better than what was estimated, some of the transmitted RVs may be redundant for decoding. This is illustrated in FIG. 5A, where the RVs 505, 510 are bundled and transmitted (without the transmitter getting feedback) in one/multiple TTIs. As illustrated in FIG. 5A, RV2 510 may not be required for decoding, as decoding is possible with only RV0 505.

It should be noted in FIG. 5A that the transmitter would not have transmitted RV2 510 in the first place, had the channel prediction been performed precisely. Thus, an appropriate bundle size as discussed above (in this example, a bundle of size one, containing only RV0 505) could have been transmitted. However, as discussed previously, in NTNs, the channel state information may become stale due to high propagation delays.

Thus, the bundling needs to be such that the transmitter should not provide more than required redundancies per TB, as this leads to wastage of resources, but rather provide redundancies across TBs, leading to increased spectral efficiency. As the RVs are transmitted as a bundle (across one or multiple TTIs), the transmitter has no way of obtaining feedback, and it transmits all the RVs (e.g., RV0 505, RV2 510) using the same MCS, and number of resource blocks. That is, in this example, the amount of resource blocks that was used for transmission of the RV2 510 was redundant (i.e. the spectral inefficiency which is the ratio of the number of additional PRBs used to the number of PRBs actually required, is 100%).

Figure 5B:
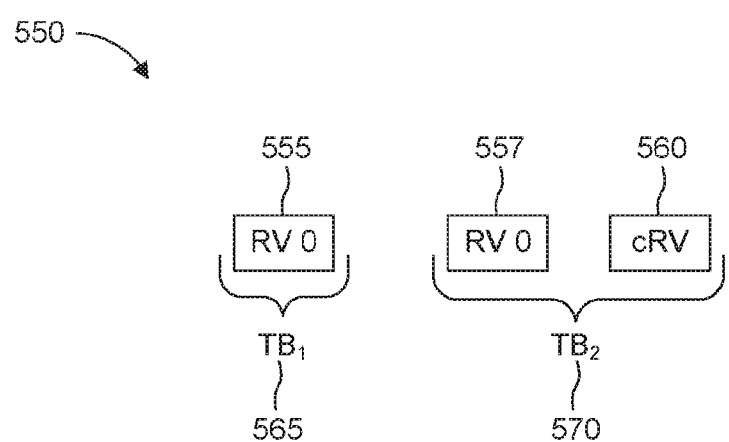
FIG. 5B is a diagram illustrating an example transmission of a TB that includes an RV and a cross redundancy version (cRV) jointly for multiple TBs.

FIG. 5B illustrates an example transmission 550 of a transport block (TB) that includes an RV and a cross redundancy version (cRV) jointly for multiple TBs, which may be used in any combination of other embodiments described herein. Controlled redundancy may be introduced so as to maintain the chances of successful decoding, yet be spectrally efficient. This leads to the notion of cross redundancy versions (cRV) 560 that introduces redundancy version(s) across multiple TBs 565, 570 as illustrated in FIG. 5B. For example, the cRV 560 illustrated in FIG. 5B denotes the redundancy version jointly for TBs, $TB_1$ 565, and $TB_2$ 570. The cRV-based scheme is efficient because cRV 560 is transmitted jointly for $TB_1$ 565 and $TB_2$ 570 as a part of $TB_2$ 570 transmission. Specifically, assuming for simplicity that $TB_1$ 565, and $TB_2$ 570 are of same size and hence similar MCS and number of physical resource blocks (PRBs) would be used for both TBs 565, 570 for bundled transmission, it can be seen that the average spectral inefficiency across $TB_1$ 565, and $TB_2$ 570 may be reduced to 50%, while providing the required redundancy per TB. Thus, the cRV 560 may not only produce parity individually for its codewords/code blocks (CBs)/code block groups (CBG) in a TB, but also generates one or more redundancy versions jointly across codewords/CBs/CBGs between multiple TBs. In addition to transmitting RVs for individual CBGs for a TB, one or more cRVs may be transmitted across CBs/CBGs between multiple TBs. Thus, the cRVs may be defined as the RVs generated or punctured across or between CBs/CBGs/codewords belonging to different TBs.

Figure 6A:
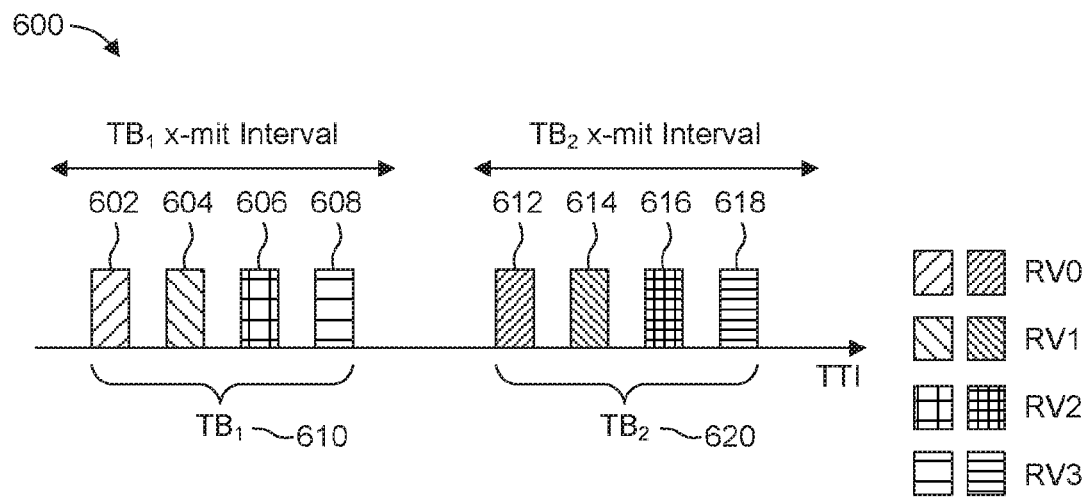
FIG. 6A is a diagram illustrating an example transmission of RVs as a bundle where the RVs are associated with a particular TB.

FIG. 6A illustrates an example transmission 600 of redundancy versions (RVs) as a bundle where the RVs are associated with a particular transport block (TB). As illustrated in FIG. 6A, RV0 602, RV1 604, RV2 606, and RV3 608 are associated with TB1 610. These RV0 602, RV1 604, RV2 606, and RV3 608 may be transmitted as a bundle across one TTI, or may be transmitted each in a TTI totaling 4 TTIs. Once a transmitter sends RV0 602, RV1 604, RV2 606, and RV3 608 to a receiver, the receiver may decode TB1 610 using RV0 602, RV1 604, RV2 606, and/or RV3 608. If TB1 610 is successfully decoded, the receiver may transmit positive HARQ feedback (i.e. ACK) to the transmitter. If TB1 610 is not successfully decoded, the receiver may transmit a negative HARQ feedback (i.e. NACK) to the transmitter. Similarly, as illustrated in FIG. 6A, RV0 612, RV1 614, RV2 616, and RV3 618 are associated with TB2 620. These RV0 612, RV1 614, RV2 616, and RV3 618 may be transmitted as a bundle during TB2 transmit interval (e.g., TTI). Once the transmitter sends RV0 612, RV1 614, RV2 616, and RV3 618 to the receiver, the receiver may decode TB2 620 using RV0 612, RV1 614, RV2 616, and/or RV3 618. If TB2 620 is successfully decoded, the receiver may transmit positive HARQ feedback (i.e. ACK) to the transmitter. If TB2 620 is not successfully decoded, the receiver may transmit negative HARQ feedback (i.e. NACK) to the transmitter. The size of bundle for the RVs 602, 604,606, 608 associated with TB1 610 or RVs 612, 614, 616, 618 associated with TB2 620 may be predetermined, fixed, or signaled. For example, in LTE, the size of bundle may be 4 per TB and the RVs in a bundle may only correspond to a particular TB.

Figure 6B:
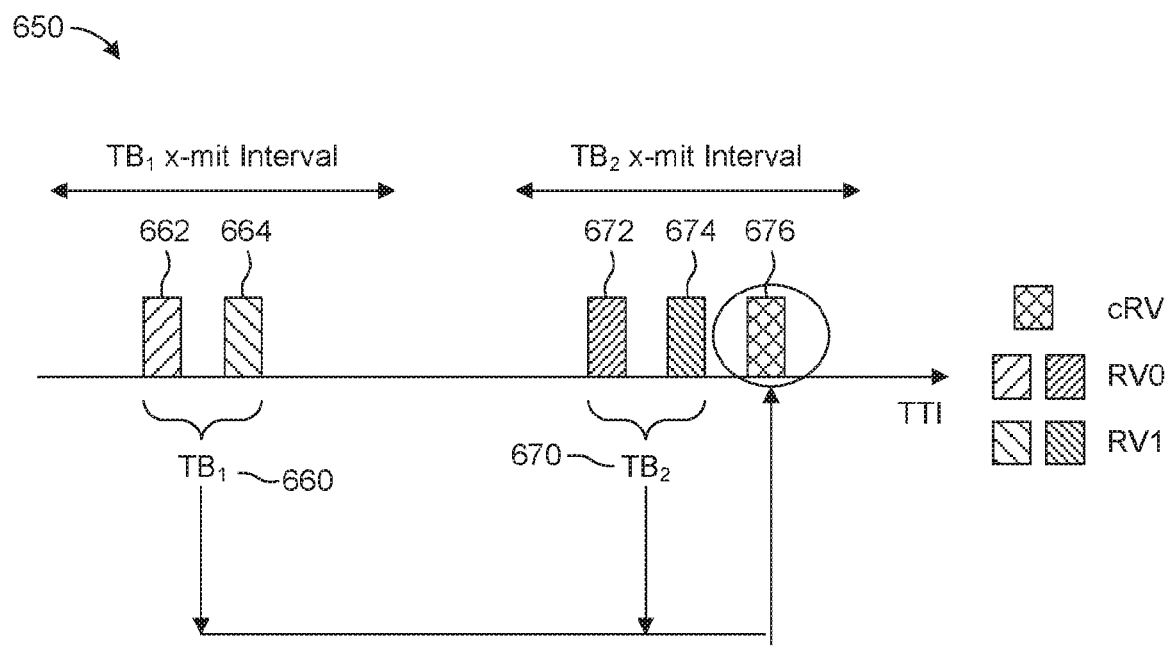
FIG. 6B is a diagram illustrating an example transmission of RVs and a cRV where the cRV is associated with multiple TBs.

FIG. 6B illustrates an example transmission 650 of redundancy versions (RVs) and a cross redundancy version (cRV) where the cRV is associated with multiple transport blocks (TBs), which may be used in any combination of other embodiments described herein. As illustrated in FIG. 6B, RV0 662 and RV1 664 are associated with TB1 660 and may be transmitted as a bundle during TB1 transmit interval (e.g., TTI). Similarly, RV0 672 and RV1 674 are associated with TB2 670, but RV0 672 and RV1 674 are transmitted with cRV 676 during TB2 transmit interval (e.g., TTI). The cRV 676 may include information and/or parity bits that correspond to TB1 660 and TB2 670. These coded (information and/or parity) bits may be used to decode TB1 660 and TB2 670. The cRV 676 may be generated across TB1 660 and TB2 670. Specifically, information bits from TB1 660 and information bits from TB2 670 may be combined to generate concatenated information bits. These concatenated information bits may be channel coded/rate matched to generate one or more RVs (i.e. RVs for concatenated TB). These RVs may be punctured with puncturing ratio to generate the cRV 676. Although two TBs 660, 670 are illustrated in FIG. 6B, the number of TBs in generating a cRV is not limited. Moreover, one or more cRVs may be generated from/across/between any number of TBs. In some embodiments, one or more cRV may be generated from/across/between multiple code block groups (CBGs) associated with one or more TBs.

Figure 7:
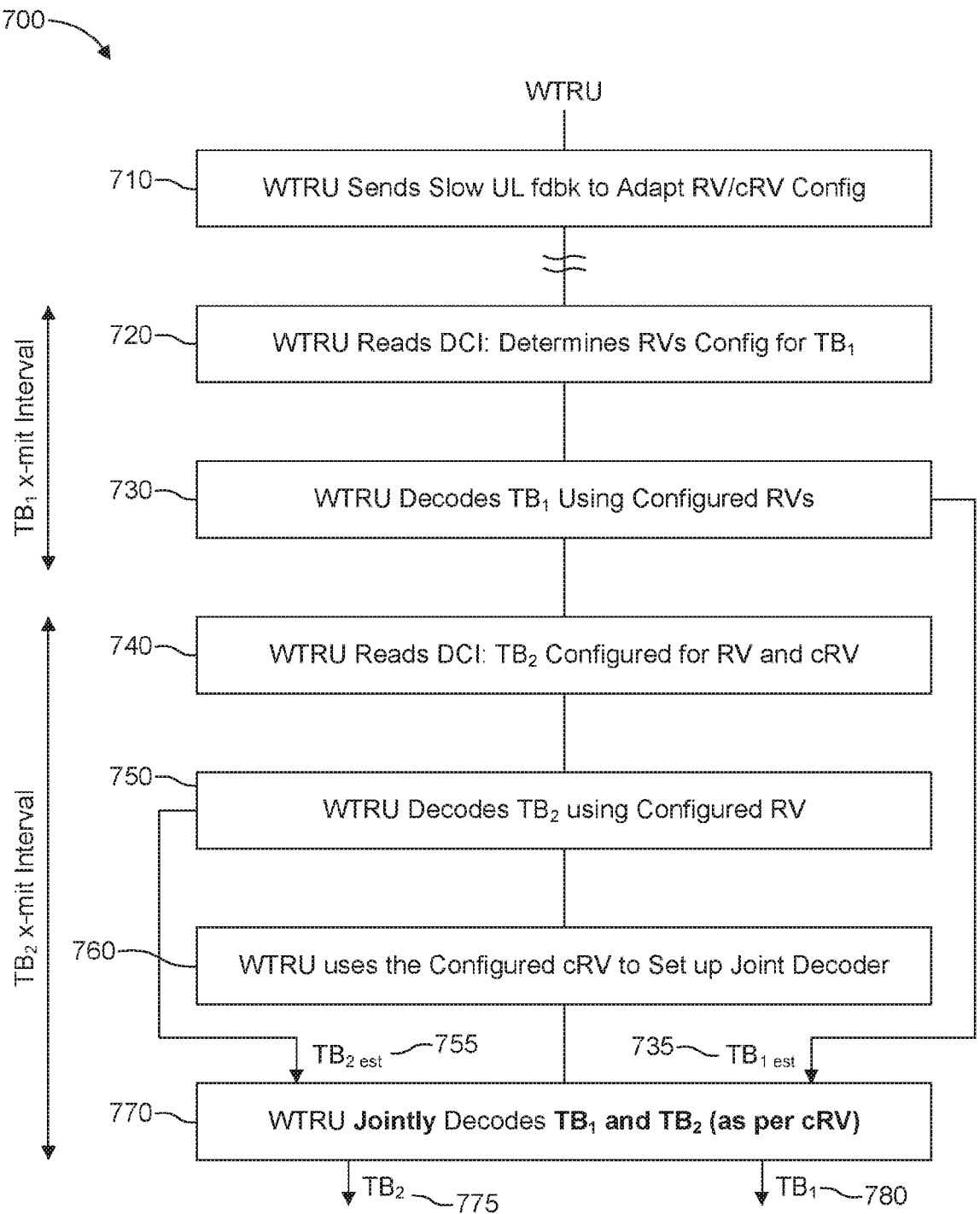
FIG. 7 a diagram illustrating an example joint decoding procedure with cRV associated with multiple TBs.

FIG. 7 illustrates an example joint decoding procedure 700 with cross redundancy version (cRV) associated with multiple transport blocks (TBs), which may be used in any combination of other embodiments described herein. At step 710, a WTRU may transmit, to a base station (BS) (e.g., gNB), uplink (UL) feedback (or slow feedback) that includes configuration for redundancy versions (RVs) and cross redundancy versions (cRVs). The UL feedback (or slow feedback) may refer to feedback based on multiple TTIs, unlike instantaneous feedback that is performed every TTI. Specifically, the UL feedback (or slow feedback) may be generated based on statistical information of one or more TTIs associated with current and/or past transmissions. Examples of the statistical information may include, but are not limited to, channel statistics in a certain reporting interval, how many times a channel exceeds some threshold, and how many times the channel is within a certain range. The configuration included in the UL feedback (or slow feedback) may include, but are not limited to, a number of RVs per bundle, an RV index, a CBG index, TTI mapping for TBs, and cRV signaling information. The cRV signaling information may include, but are not limited to, the number of TBs for which a cRV is valid, the actual TBs for which the cRV applies, and CBGs for which the cRV is transmitted. In the embodiment illustrated in FIG. 6B, the UL feedback may indicate the BS that: (1) the number of RVs per TB is two; (2) cRV 676 is associated with (or generated across) TB1 660 and TB2 670; and (3) cRV 676 is transmitted in TB2 670 transmission interval.

In an embodiment, the UL feedback may be transmitted using an indicator or a bitmap that includes the configuration information described above. Alternatively or additionally, the examples of configuration information included in the indicator or the bitmap are described in Tables 1, 2 3 and/or 4 throughout this disclosure.

TABLE 3

| cRV | # TBs | TBs considered for encoding |
|---|---|---|
| 3 | 1 | n |
| 4 | 2 | (n − 1, n) |
| 5 | 3 | (n − 1, n, n + 1) |

For example, as shown in Table 3, the cRV configuration may indicate that cRV4 is associated with two TBs, which are to be transmitted in previous transmission interval (i.e. n−1) and current transmission interval (i.e. n). The current transmission n may indicate that the cRV4 is included in the current transmission. In the example of FIG. 6B, n−1 indicates the previous transmission interval of TB1 and n indicates the current transmission interval of TB2 that includes cRV 676 transmission.

At step 720, the WTRU may receive (or read), from the BS, downlink control information (DCI) via a downlink control channel. The DCI may include configuration information indicating that one or more RVs are configured for a first transport block (TB1). This is because the transmitter (e.g., BS) does not have to transmit all RVs associated with the first TB. The transmitter may select one or more RVs and transmit them to the WTRU with indication of RV numbers. Based on the DCI, the WTRU may determine that which RV(s) is/are configured for the first TB. The WTRU may then receive, from the BS, the one or more RVs associated with the first TB. At step 730, the WTRU may decode, using the configured RVs, the first TB. If the received TB1 is unsuccessfully decoded, the WTRU may generate a first estimated TB (i.e. $TB_{1\ est}$ 735) that includes estimated information bits for the first TB.

At step 740, the WTRU may receive (or read), from the BS, another downlink control information (DCI) via a downlink control channel. The DCI may include configuration information indicating that one or more RVs and at least one cRV are configured for a second transport block (TB2). Based on the DCI, the WTRU may determine which RV(s) is/are configured for the second TB and whether cRV is configured for the second TB (e.g., configured for the second TB transmission). The WTRU may also determine whether the cRV is associated with the first and second TBs or any other TBs. More specifically, the WTRU may determine which TBs are associated with the received cRV. The WTRU may then receive, from the BS, the one or more RVs associated with the second TB. At step 750, the WTRU may decode, using the configured RVs, the second TB. If the received TB2 is unsuccessfully decoded, the WTRU may generate a second estimated TB (i.e. $T_{2\ est}$ 755) that includes estimated information bits for the second TB.

At step 760, the WTRU may set up joint decoder using the configured cRV. For example, if at least one of first TB (e.g., TB1) or the second TB (e.g., TB2) is unsuccessfully decoded, the WTRU may decode the first and second TBs jointly based on the cRV at step 770. Specifically, if the first estimated TB 735 is generated (i.e. TB1 is not successfully decoded) but the second estimated TB 755 is not generated (i.e. TB2 is successfully decoded), the WTRU may concatenate the first estimated TB 735 and the second TB and decode the concatenated TB using the cRV. If the first estimated TB 735 is not generated (i.e. TB1 is successfully decoded) but the second estimated TB 755 is generated (i.e. TB2 is not successfully decoded), the WTRU may concatenate the first TB and the second estimate TB 755 and decode the concatenated TB using the cRV. If the first estimated TB 735 is generated (i.e. TB1 is not successfully decoded) and the second estimated TB 755 is generated (i.e. TB2 is not successfully decoded), the WTRU may concatenate the first estimate TB 735 and the second estimate TB 755 and decode the concatenated TB using the cRV.

If the concatenated TB is successfully decoded at step 770, final decoded information bits, TB1 780 and TB2 775, are generated and the WTRU may transmit positive HARQ feedback corresponding to TB1 and TB2 to the BS. If the concatenated TB is not successfully decoded, the WTRU may transmit negative HARQ feedback to the BS corresponding to TB1 and TB2.

Figure 8:
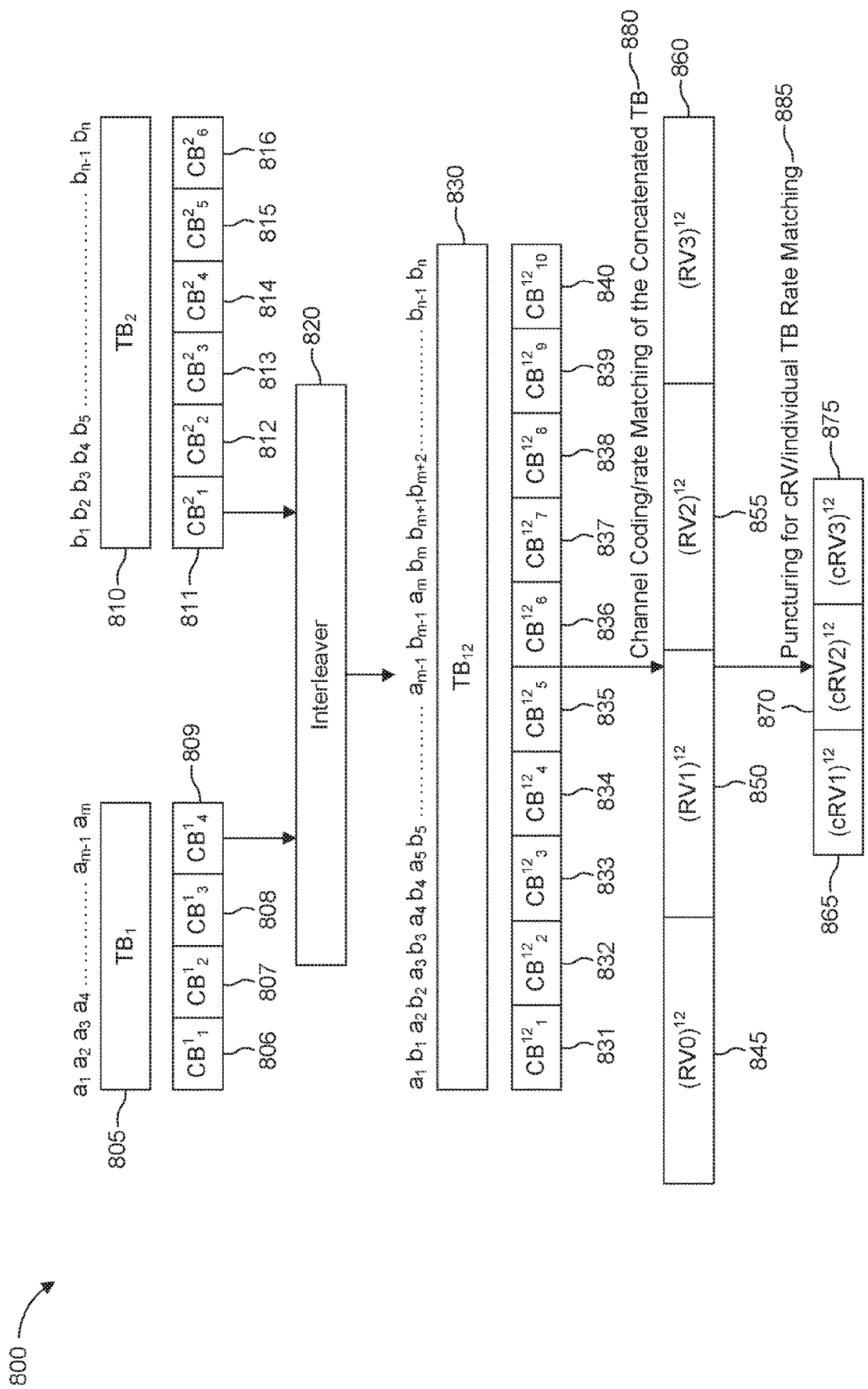
FIG. 8 is a diagram illustrating an example encoding procedure for cRVs generated across multiple TBs.

Embodiments for cross redundancy versions (cRVs) generation (e.g., encoding and decoding) are described herein. As shown in FIG. 4, a TB can be segmented into code blocks (CBs) that are further mapped into code block groups (CBG). FIG. 8 illustrates an example encoding procedure 800 for cRVs generated across multiple TBs, which may be used in any combination of other embodiments described herein. Although the encoding procedure 800 illustrates two TBs 805, 810 segmented into CBs 806, 807, 808, 809, 811, 812, 813, 814, 815, 816 and cRVs 865, 870, 875 generated across/between two TBs 805, 810, this encoding scheme can be extend to more than two TBs. The cRVs can also be generated across/between multiple CBGs for a single TB or multiple TBs.

Referring now to FIG. 8, $TB_1$ 805 and $TB_2$ 810 are two transport blocks of size m, and n respectively. Without loss of generality, m is less than n (i.e. m<n). $CB^k_m$ denotes the $m^{th}$ code block associated to an (individual) transport block k (k=1, 2). Further, the $m^{th}$ code block corresponding to the concatenation of $TB_1$ 805 and $TB_2$ 810 is denoted by $CB^{12}_m$. It is noted that code block size may be fixed, given conditions, per standards. It is also noted that in FIG. 8, the code block size for $TB_1$ 805 and $TB_2$ 810 need not be the same. The encoding of the joint TB, denoted by $TB_{12}$ 830, to generate the cRVs 865, 870, 875 proceeds according to the following steps.

$a_1, a_2 \ldots a_{m-1}, a_m$ may denote the input bits of transport block $TB_1$ 805, and $b_1, b_2 \ldots b_n$ denote the input bits of transport block, $TB_2$ 810. The transport blocks $TB_1$ 805 and $TB_2$ 810 may be first interleaved as shown in step 820 to obtain $TB_{12}$ 830. It is noted that the purpose of the interleaver is to uniformly intersperse the input bits of $TB_1$ 805 and $TB_2$ 810 in the concatenated transport block $TB_{12}$ 830. This may be done with the intention that any code block, $CB^{12}_m$ (e.g., $CB^{12}_1$ 831, $CB^{12}_2$ 832, $CB^{12}_3$ 833, $CB^{12}_4$ 834, $CB^{12}_5$ 835, $CB^{12}_6$ 836, $CB^{12}_7$ 837, $CB^{12}_8$ 838, $CB^{12}_9$ 839, $CB^{12}_{10}$ 840) corresponding to the concatenated transport block (e.g., $TB_{12}$ 830), has roughly the same number of input bits (or proportional to their transport block size) of $TB_1$ 805 and $TB_2$ 810. In this example, the output of the interleaver yields the input bits $a_1, b_1, a_2, b_2, a_3, b_3 \ldots a_m, b_m, b_{m+1}, \ldots b_n$. In other embodiments, alternate interleavers are possible.

Using the fixed code block size specified in standards, $TB_{12}$ 830 may be segmented in code blocks, $CB^{12}_m$ (m=1, 2 . . . ) that includes the fixed size code redundancy check (CRC) attachment. It is noted that $CB^1_m$ (m=1, 2 . . . ) and $CB^2_m$ (m=1, 2 . . . ) may have their own CRCs.

Each of the code blocks, $CB^{12}_m$ (m=1, 2 . . . ) 831, 832, 833, 834, 835, 836, 837, 838, 839, 840 is channel encoded, (e.g., Low Density Parity Check Code (LDPC), Polar coding, or the like) using the parity check matrix specified in standards, and rate matched outputs are obtained.

The rate matched outputs of all the code blocks 831, 832, 833, 834, 835, 836, 837, 838, 839, 840 may be sequentially concatenated to yield the different rate matched versions for the concatenated TB 830 as denoted in step 880. The rate matched outputs of the concatenated TB 830 are represented by, $(RV)^{12}=[(RV0)^{12}$ 845, $(RV1)^{12}$ 850, $(RV2)^{12}$ 855, $(RV3)^{12}$ 860]. Here, $(RVx)^{12}$ 845, 850, 855, 860 denotes the redundancy version x (x=0, 1, 2, 3) generated for $TB_{12}$ 830. $(RV)^{12}$ denotes all the redundancy versions concatenated for the joint Transport Block $TB_{12}$ 830.

Finally, the cRVs (e.g., $(cRV1)^{12}$, $(cRV2)^{12}$, $(cRV3)^{12}$) may be generated from $(RV)^{12}$ 845, 850, 855, 860 as follows. $(RV0)^{12}$ 845 may not be considered as part of cRVs 865, 870, 875, as it represents mostly the systematic bits. As shown in step 885, $(RV1)^{12}$ 850, $(RV2)^{12}$ 855, $(RV3)^{12}$ 860 may be punctured according to the ratio of size of the (e.g., individual) TB in which one or more of the cRVs 865, 870, 875 will be transmitted to the sum of the sizes of the TBs 805, 810 across which the cRVs 865, 870, 875 are generated. For example, if one or more of the cRVs 865, 870, 875 are transmitted as a bundle along with $TB_2$ 810, and the one or more of the cRVs 865, 870, 875 are generated between $TB_1$ 805 and $TB_2$ 810, the puncturing ratio may be, $$r = \frac{TB_2}{TB_1 + TB_2}.$$

Thus, to obtain $(cRVx)^{12}$ 865, 870, 875 where x=1, 2, 3, $(RVx)^{12}$ 845, 850, 855, 860 where x=0, 1, 2, 3 may be punctured with ratio r, as shown in step 885. Puncturing $(RVx)^{12}$ 845, 850, 855, 860 may mean taking one or more bits (or dropping zero or more bits) from $(RVx)^{12}$ 845, 850, 855, 860 to generate $(cRVx)^{12}$ 865, 870, 875. It may or may not take all of the bits from $(RVx)^{12}$ 845, 850, 855, 860. For example, every other bit may be taken from $(RV1)^{12}$ 845 to generate $(cRV1)^{12}$ 865 with half ratio (i.e. ½). In an embodiment, a set of allowable puncturing ratio sets, $S=\{s_1, s_2 \ldots s_k\}$ (satisfying $s_i<s_{i+1}$) may be predefined and for the obtained puncturing ratio, $\hat{r}$, the highest $s_m$ such that $s_m \leq r$ may be chosen. That means, the puncturing may actually be performed with ratio $\hat{r}=s_m$. For example, if $$S = \left\{\frac{1}{4}, \frac{1}{2}, \frac{3}{4}, \frac{7}{8}\right\},$$

and it the ratio of me TB sizes are such that, r=0.79, the actual puncturing ratio used may be, $$\hat{r} = \frac{3}{4}.$$

Finally, the cRVs generated are $(cRV)^{12}=[(cRV1)^{12}$ 865, $(cRV2)^{12}$ 870, $(cRV3)^{12}$ 875]. It is noted that the cRVs 865, 870, 875 can be generated from any number of TBs.

Embodiments for cRV transmission with bundling are described herein. cRV that represents the cross parity between two or more transport blocks may always be transmitted along with the one or more redundancy versions of the individual transport blocks as a bundle. This is due to the fact that in partial HARQ Incremental Redundancy (IR), a transport block may need to be decodable using the individual redundancy versions and hence it is possible for a device to estimate the information/input bits. Since redundancy version 0 (that represents mostly the systematic bits) of the individual transport blocks may be transmitted in any bundle, nothing may be gained from transmitting cross redundancy version 0 which again represents the systematic bits. This is why any of $(cRVx)^{12}$ (x=1, 2, 3), for example, are assumed to be transmitted as a part of the cRV transmission. Furthermore, $(cRVx)^{12}$ (x=1, 2, 3) may be transmitted as a bundle along with any number of redundancy versions of individual transport blocks.

Figure 9:
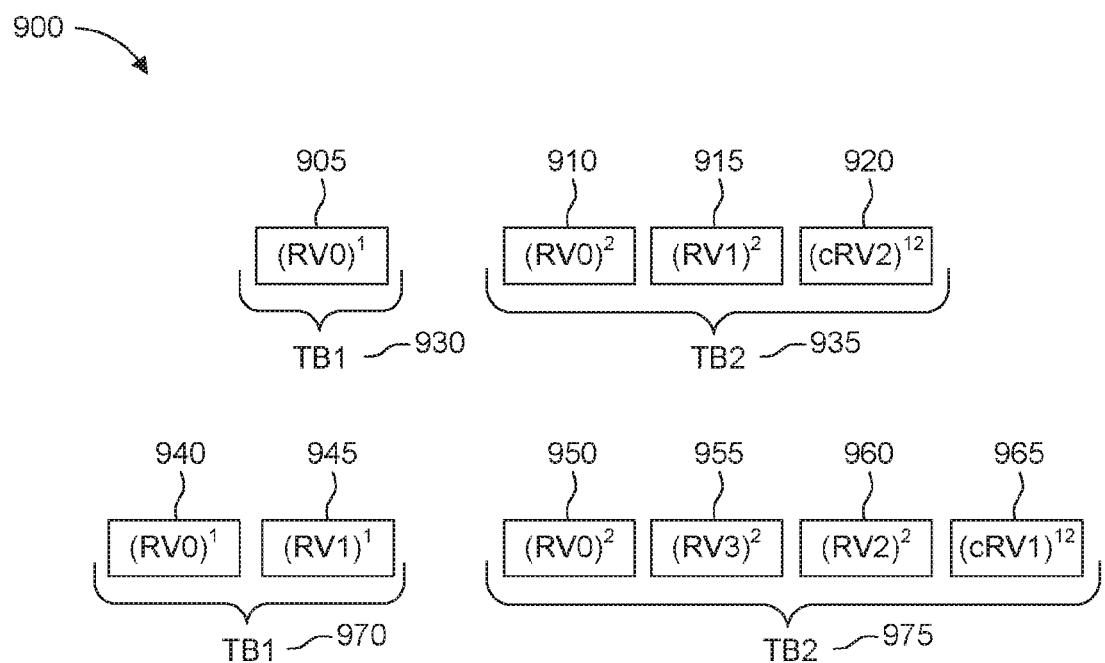
FIG. 9 is a diagram illustrating an example cRV transmission by bundling with any number of individual RVs.

FIG. 9 illustrates an example cross redundancy version (cRV) transmission by bundling with any number of individual redundancy versions (RVs), which may be used in any combination of other embodiments described herein. In FIG. 9, $(RVx)^k$ may represent individual redundancy version x of transport block k, and $(cRVx)^{kp}$ may represent cross redundancy version x between $TB_k$ and $TB_p$. As illustrated in FIG. 9, $(cRV2)^{12}$ 920 may be generated between/across TB1 930 and TB2 935 and transmitted along with $(RV0)^2$ 910 and $(RV1)^2$ 915 of the individual TB2 935 as a bundle. The receiver may initiate the process of decoding TB2 935 after it receives all $(RV0)^2$ 910, $(RV1)^2$ 915, and $(cRV2)^{12}$ 920 as a bundle. In another example illustrated in FIG. 9, $(cRV1)^{12}$ 965 may be generated between/across TB1 970 and TB2 975 and transmitted along with $(RV0)^2$ 950, $(RV3)^2$ 955, and $(RV2)^2$ 960 of the individual TB2 975 as a bundle. The receiver may initiate the process of decoding TB2 975 after it receives all $(RV0)^2$ 950, $(RV3)^2$ 955, $(RV2)^2$ 960 and $(cRV1)^{12}$ 965 as a bundle.

FIG. 10 illustrates an example decoding procedure 1000 using a cRV generated across multiple TBs, which may be used in any combination of other embodiments described herein. Although the decoding procedure 1000 is illustrated with two TBs, this decoding scheme can be extend to more than two TBs. The cRV 1050 may also be generated across/between multiple CBGs for a single TB or multiple TBs.

Assuming that $(RVx)^1$ (where x=0, 1, 2, 3, . . . ) denotes one or more redundancy versions of $TB_1$, $TB_1$ may be individually decoded and estimated at step 1005 using the individual redundancy versions $(RV0)^1$, and any or all of $(RV1)^1$, $(RV2)^1$, $(RV3)^1$ depending on what was transmitted in the bundle. After $TB_1$ is decoded or estimated, the estimate of input bits of the transport block, $TB_1$ (i.e. $TB_{1\_est}$) may be generated, for example, $a_1', a_2' \ldots a_{m-1}', a_m'$ 1015. The estimated information bits $a_1', a_2' \ldots a_{m-1}', a_m'$ 1015 may or may not be accurate. In other words, $TB_1$ may or may not be successfully decoded.

Similarly, assuming that $(RVx)^2$ (where x=0, 1, 2, 3, . . . ) denotes one or more redundancy versions of $TB_2$, $TB_2$ may be individually decoded and estimated at step 1010, using the individual redundancy versions $(RV0)^2$, and any or all of $(RV1)^2$, $(RV2)^2$, $(RV3)^3$ depending on what was transmitted in the bundle. After $TB_2$ is decoded or estimated, the estimate of input bits of the transport block, $TB_2$ (i.e. $TB_{2\_est}$) may be generated, for example $b_1', b_2' \ldots b_{n-1}', b_n'$ 1020 based on the individual redundancy versions $(RV0)^2$, and any or all of $(RV1)^2$, $(RV2)^2$, $(RV3)^2$. The estimated information bits $b_1', b_2' \ldots b_{n-1}', b_n'$ 1020 may or may not be accurate. In other words, $TB_2$ may or may not be successfully decoded.

In case that one or both the transport blocks $TB_1$, and $TB_2$ were not successfully decoded (i.e. inaccurate information bits are generated at least one of TBs) based on the individual redundant versions, the receiver may uses the cRV 1050 to obtain the final decoded output 1055 as follows. At step 1025, using the signaled or agreed upon interleaver between the transmitter and receiver, the receiver may form an estimate of the concatenated transport block $TB_{12}$, as shown in FIG. 10. It is noted that 'Estimate $TB_1$ or $TB_{1\_est}$' and or 'Estimate $TB_2$ or $TB_{2\_est}$' may be maintained at the receivers buffers and may not be discarded even if the transport block was decoded correctly. The number of successfully or unsuccessfully decoded transport block estimates to be maintained in the buffers at the receiver may equal the maximum number of transport blocks across which the cRV 1050 is generated. For example, in Table 4 below, the maximum number of TBs across which a cRV is generated is 4, which corresponds to cRV7. On the downlink, a WTRU may be preconfigured (or predetermined) or configured via radio resource control (RRC) signaling the number of buffers to maintain per HARQ process with value $cRV_{SBSize}$ by a BS (e.g., eNB or gNB). On the uplink, the number of soft buffers the BS (e.g., eNB or gNB) maintains per HARQ process per HARQ entity may be predetermined, signaled, or implementation specific.

The estimate of concatenated transport block (i.e. Estimate of $TB_{12}$ 1030) may be divided into code block segments (e.g., $CB^{12}_1$ 1031, $CB^{12}_2$ 1032, $CB^{12}_3$ 1032, $CB^{12}_3$ 1033, $CB^{12}_4$ 1034, $CB^{12}_5$ 1035, $CB^{12}_6$ 1036, $CB^{12}_7$ 1037, $CB^{12}_8$ 1038, $CB^{12}_9$ 1039, and $CB^{12}_{10}$ 1040), for example, using a code block segment size as standardized for any LTE/NR wireless unit.

As an example, $a_1', b_1', a_2', b_2', a_3', b_3', a_4', b_4'$ may be the estimate of the input bits of the first code block $CB^{12}_1$ at the receiver. It is noted that the corresponding input bits of the concatenated transport block encoded at the transmitter would have been $a_1, b_1, a_2, b_2, a_3, b_3, a_4, b_4$.

Figure 11:
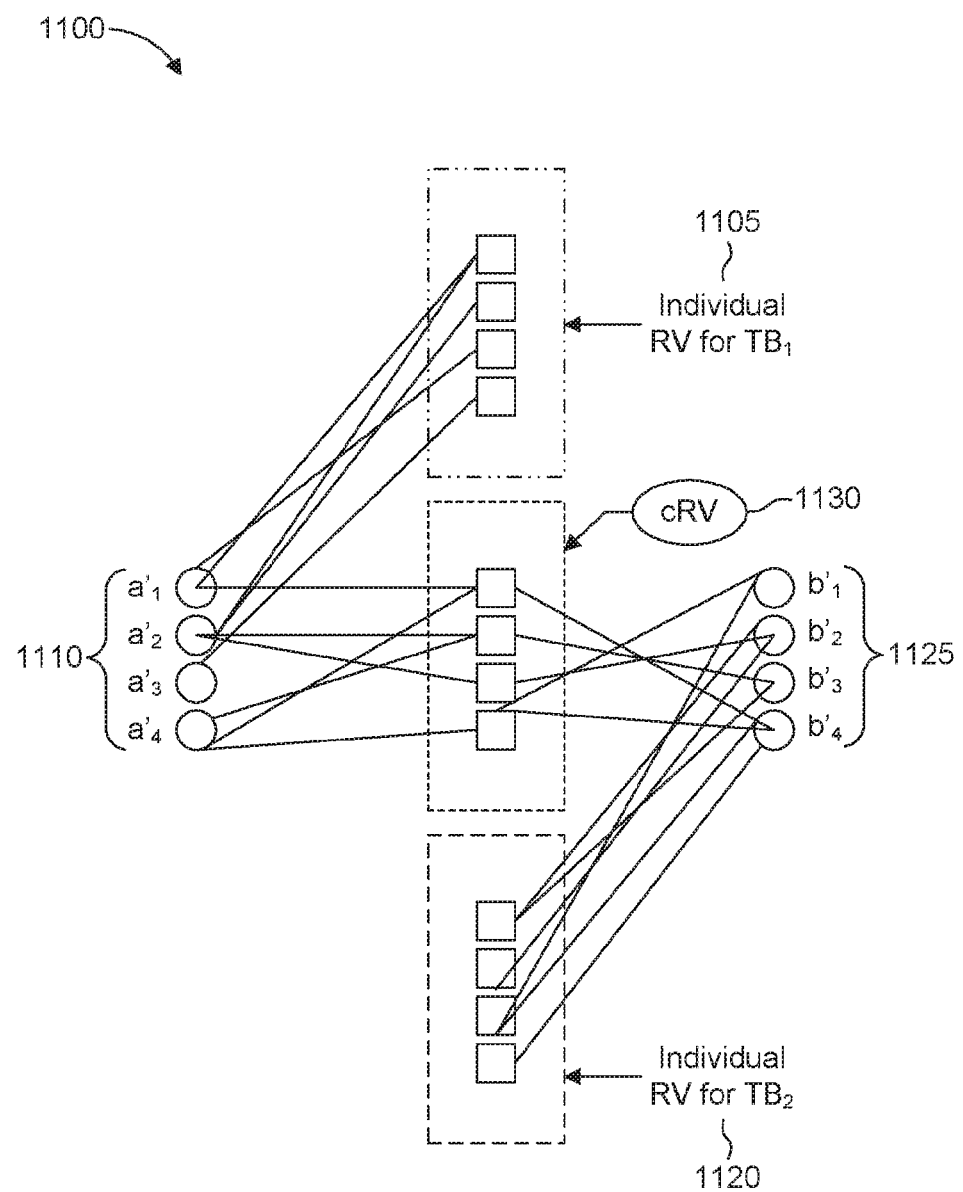
FIG. 11 is a diagram illustrating an example cRV-based joint decoding of code blocks (CBs) belonging to different TBs.

For the aforementioned sequence of information bits of the code block, it is noted that the redundant versions (e.g., RV0, RV1, RV2, RV3) are well defined in the standards. Specifically, for any parity bit (of the information bit sequence $\{a_1, b_1, a_2, b_2, a_3, b_3, a_4, b_4\}$ belonging to any redundant version, the information bits that participate in a parity bit is well defined according to the parity matrix. As the cRV are obtained by puncturing the well-defined redundancy versions (as illustrated in FIG. 11), it follows that the information that the receiver needs, to be able to use the cRV to jointly decode $TB_1$, and $TB_2$ is the puncturing matrix/ratio ($\hat{r}$) used or the puncturing ratio sets, $S=\{s_1, s_2 \ldots s_k\}$, that was used during the encoding process in FIG. 11. The puncturing matrix/ratio ($\hat{r}$), may need not be signaled explicitly (although this can be signaled), but can be inferred implicitly by the receiver. The receiver knows the transport block sizes, $TB_1$, and $TB_2$ that it has received (although the receiver was unable to decode either of them) and, because the receiver gets the cRV as a bundle during $TB_2$ transmission, it can infer $$r = \frac{TB_2}{TB_1 + TB_2}.$$

Thus, if the puncturing ratio sets, $S=\{s_1, s_2 \ldots s_k\}$, is signaled, the receiver can find out the actual puncturing ratio $\hat{r}=s_m$, where m=arg $\max_k s_k \leq r$, which was used in the cRV encoding process. It is noted that if the receiver gets the cRV as a bundle during $TB_1$ transmission, the receiver may infer $$r = \frac{TB_1}{TB_1 + TB_2},$$

and may then estimate $\hat{r}$ accordingly.

FIG. 11 illustrates an example cross redundancy version (cRV)-based joint decoding 1100 of code blocks (CBs) belonging to different transport blocks (TBs), which may be used in any combination of other embodiments described herein. The code blocks in this example cRV-based decoding may belong to $TB_1$, and $TB_2$. As illustrated in FIG. 11, the top most parity checks correspond to the redundancy versions for the individual transport block $TB_1$ 1105 where the information bits $a_1', a_2' a_3' a_4'$ 1110 participate. The bottom most parity checks denote the redundancy versions for the individual transport block, $TB_2$ 1120 where only the information bits $b_1', b_2' b_3' b_4'$ 1120 participate. The parity checks at the center correspond to cRV 1130 where information bits from both TBs participate. Specifically, a WTRU may decode $TB_1$ using individual RVs 1105 configured for $TB_1$ and obtain $TB_{1\_est}$, which is the information bits $a_1'$, $a_2'$ $a_3'$ $a_4'$ 1110. Similarly, the WTRU may decode $TB_2$ using individual RVs 1120 configured for $TB_2$ and obtain $TB_{2\_est}$, which is the information bits $b_1'$, $b_2'$ $b_3'$ $b_4'$ 1120. The WTRU may use the configured cRV 1130 to set up joint decoder and decode $TB_1$ and $TB_2$ using $a_1'$, $a_2'$ $a_3'$ $a_4'$ 1110, $b_1'$, $b_2'$ $b_3'$ $b_4'$ 1125, and the cRV 1130.

The parameters that the receiver needs to be able to use cRV for joint decoding of code blocks/transport blocks may include, but are not limited to, the interleavers for interleaving the transport blocks to form the concatenated transport block, and the puncturing ratio set $S=\{s_1, s_2 \ldots s_k\}$, to rate match the cRV depending on the TB where the cRV is bundled and transmitted. These parameters can be signaled through DCI, higher layer signaling such as RRC, MAC-CE or can be fixed or predetermined (e.g., similar to the fixed encoders/parity check matrix definition in the standards).

Embodiments for cross redundancy version (cRV) with code block groups (CBGs) are described herein. Such embodiments may include, but are not limited to, cRV encoding, transmission and decoding when CBGs are used in one or more transport blocks (TBs).

In this case, the HARQ feedback may be provided per CBG, and redundancy versions may be produced per CBG. Thus, a redundancy version for a TB can be modeled as concatenation of redundancy versions of individual CBGs. For example, RV1 for $TB_1$, denoted by $(RV1)^1$, can be written as $(RV1)^1 = [(RV1)^1_1, (RV1)^1_2, (RV1)^1_3]$, where $(RV1)^1_1$, $(RV1)^1_2$, $(RV1)^1_3$ represents the redundancy version-1 of CBGs 1, 2, and 3 respectively. Henceforth, the following notation will be used: $(RVx)^k_m$ represents the redundancy version x (where x=0, 1, 2, 3) for CBG m, and TB k; and $(RVx)^k$ represents the redundancy version x for all CBGs in TB k.

Figure 12:
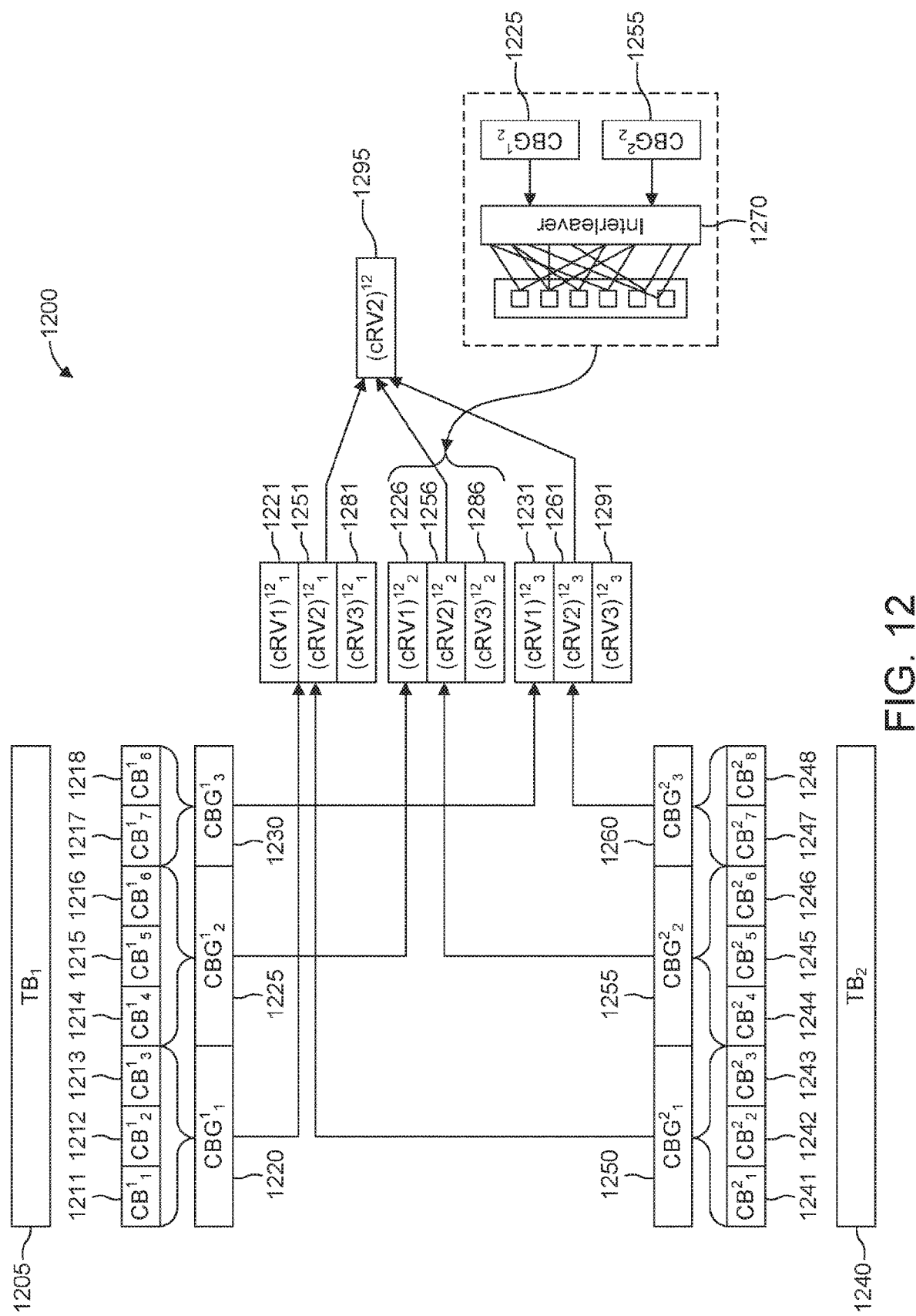
FIG. 12 is a diagram illustrating an example cRV generation between multiple TBs for different CBGs.

FIG. 12 illustrates an example cross redundancy version (cRV) generation 1200 between multiple transport blocks (TBs) for different code block groups (CBGs), which may be used in any combination of other embodiments described herein. cRVs 1221, 1251, 1281, 1226, 1256, 1286, 1231, 1261, 1291 can be generated between CBGs 1220, 1225, 1230, 1250, 1255, 1260 of a single TB or different TBs 1205, 1240. As illustrated in FIG. 12, $TB_1$ 1205 includes code blocks, $CB^1_1$ 1211, $CB^1_2$ 1212, $CB^1_3$ 1213, $CB^1_4$ 1214, $CB^1_5$ 1215, $CB^1_6$ 1216, $CB^1_7$ 1217, and $CB^1_8$ 1218. Each of the code blocks may be grouped by one or more code block groups. For example, $CB^1_1$ 1211, $CB^1_2$ 1212, and $CB^1_3$ 1213 may be grouped by $CBG^1_1$ 1220, $CB^1_4$ 1214, $CB^1_5$ 1215, and $CB^1_6$ 1216 may be grouped by $CBG^1_2$ 1225. $CB^1_7$ 1217 and $CB^1_8$ 1218 may be grouped by $CBG^1_3$ 1230. Similarly, $TB_2$ 1240 includes code blocks, $CB^2_1$ 1241, $CB^2_2$ 1242, $CB^2_3$ 1243, $CB^2_4$ 1244, $CB^2_5$ 1245, $CB^2_6$ 1246, $CB^2_7$ 1247, and $CB^2_5$ 1248. Each of the code blocks may be grouped by one or more code block groups. For example, $CB^2_1$ 1241, $CB^2_2$ 1242, and $CB^2_3$ 1243 may be grouped by $CBG^2_1$ 1250, $CB^2_4$ 1244, $CB^2_5$ 1245, and $CB^2_6$ 1246 may be grouped by $CBG^2_2$ 1255. $CB^2_7$ 1247, and $CB^2_8$ 1248 may be grouped by $CBG^2_3$ 1260.

The notations used in FIG. 12 are as follows. $CBG^k_m$ denote the code block group corresponding to CBG m of TB k. Similar notation may apply to the code block $CB^k_m$. $(cRVx)^{pq}_m$ denotes the cross redundancy version x (x=1, 2, 3) generated for group m, by $CBG^p_m$ (from $TB_p$), and $CBG^q_m$ (from $TB_q$). For example, $(cRV2)^{12}_3$ 1261 denotes the cross redundancy version 2 corresponding to code block group 3, generated by $CBG^1_3$ 1230 (from $TB_1$ 1205), and $CBG^2_3$ 1260 (from $TB_2$ 1240). $(cRVx)^{pq}$ represents the cross redundancy version x (x=1, 2, 3) for all code blocks groups between $TB_p$ and $TB_q$. For example, $(cRV2)^{12}$ 1295 represents cRV2 for all CBGs (i.e. $(cRV2)^{12}_1$ 1251, $(cRV2)^{12}_2$ 1256, $(cRV2)^{12}_3$ 1261) between $TB_1$ 1205 and $TB_2$ 1240.

cRV generation proceeds as follows. Similar numbered code block groups in $TB_1$ 1205 and $TB_2$ 1240 are used to generate cross redundancy versions. For example, cross parity bits produced jointly using $CBG^1_3$ 1230 and $CBG^2_3$ 1260 yields cross redundancy versions: $(cRV1)^{12}_3$, $(cRV2)^{12}_3$, and $(cRV3)^{12}_3$. The procedure for generating cross redundancy versions between CBGs belonging to two different transport blocks is similar to the encoding procedure depicted in FIG. 8, with the transport blocks $TB_1$ and $TB_2$ replaced by code block groups $CBG^k_m$. That is, an interleaver may be used to produce a concatenated code block group, and the concatenated code block group may be segmented into code blocks, and encoding is performed per code block in a typical manner. For example, an interleaver 1270 is used to concatenate $CBG^1_2$ 1225 and $CBG^2_2$ 1255. Channel coding and/or rate matching may be performed on the concatenated CBG, thereby generating one or more redundancy versions. These redundancy versions may be punctured with individual CBG rate matching to generate cRVs, $(cRV1)^{12}_2$, $(cRV2)^{12}_2$, and $(cRV3)^{12}_2$.

As encoding of cRV may be performed per CBG, independent interleavers may be provided per CBG, if required. Furthermore, puncturing ratio for generating cRV per CBG may depend on the TB that it is transmitted using, and also on the CBG sizes it occupies in the corresponding transport blocks. For example, the puncturing ratio for obtaining cross redundancy version for code block group, m, from the redundancy versions of the concatenated code block groups $CBG^1_m$ and $CBG^2_m$, is $$r_m = \frac{CBG^i_m}{CBG^1_m + CBG^2_m},$$

if the cRV is transmitted as a bundle in $TB_i$ (i=1, 2). $(cRVx)^{12}_m$ (x=1, 2, 3) for a specific code block group, m may also be transmitted as a part of the bundle along with the individual redundancy versions of $k^{th}$ transport block, $(RVx)^k$ (x=0, 1, 2, 3).

Finally, it is noted that in addition that cRV can be generated across multiple transport blocks (e.g., current, past and future TBs), cross redundancy versions may be generated across dissimilar CBGs. For example, cRV may be obtained by generating parity bits using $CBG^1_2$ 1225, and $CBG^2_3$ 1260 (i.e., between code block group 2 of $TB_1$ 1205 and code block group 3 of $TB_2$ 1240) unlike constraining them to be generated using similar numbered code block groups as the example illustrated in FIG. 12.

Embodiments for cRV signaling are described herein. 4G/NR systems currently use four redundancy versions for a transport block. With the cross redundancy version (cRV) described herein, the signaling of RV may incorporate: (1) the number of transport blocks for which a cRV is valid; (2) the actual transport blocks for which the cRV applies; and (3) code block groups for which the cRV is transmitted. An example of cRV signaling is provided in Table 4 below.

TABLE 4

Example cRV signaling

| cRV | # TBs | TBs considered for encoding | Code Block Groups |
|---|---|---|---|
| 0 | 1 | n | All |
| 1 | 1 | n | All |
| 2 | 1 | n | All |
| 3 | 1 | n | All |
| 4 | 2 | (n, n + 1) | Even CBGs |
| 5 | 3 | (n − 1, n, n + 1) | Odd CBGs |
| 6 | 3 | (n − 1, n, n + 4) | CBG mod 3 == 0 |
| 7 | 4 | (n − 1, n, n + 2, n + 5) | All |

In Table 4 above, the first four rows represents the redundancy versions associated to individual (or single) TB (e.g., used in NR/LTE systems). The last four rows represent the redundancy versions associated with multiple transport blocks. n denotes the current transmission of TB that includes RVs associated with the current TB. n−1 denotes the previous transmission of TB that includes RVs associated with the previous TB. n+1 denotes the next transmission of TB that includes RVs associated with the next TB. For example, cRV1 (i.e. cRV=1) above represents redundancy versions for all CBGs associated to the current TB (i.e. n). It is noted in this example that the cRV may become the legacy RV as the coding is performed only within the current TB. Specifically, assuming that only one TB, TB1, is considered for encoding and TB1 comprises three CBGs, $CBG^1_1$, $CBG^1_2$, $CBG^1_3$, cRV1 simply represents the legacy redundancy version associated with only TB1. Once cRV1 is generated, cRV1 is transmitted during TTI for the current TB (i.e. n). To summarize, the first four rows may represent redundancy versions that are generated within a TB and may be transmitted at the current time instant n.

In another example, cRV4 (i.e. cRV=4) above represents redundancy version only for even CBGs associated to the current (i.e. n) and the next (i.e. n+1) transport block. It is assumed that there are three TBs transmitted: TB1 transmitted at time n−1, TB2 transmitted at time n, and TB3 transmitted at time n+1. It is also assumed that time instant n, the transmission of TB2 is performed. In this case, two TBs, TB1 and TB3, would be encoded where TB1 comprises three CBGs, $CBG^1_1$, $CBG^1_2$, $CBG^1_3$, and TB3 comprises three CBGs, $CBG^3_1$, $CBG^3_2$, $CBG^3_3$. cRV4 is generated across RVs generated from even CBGs, $CBG^1_2$ of TB1 and $CBG^3_2$ of TB3. Once the cRV4 is generated, the cRV4 is transmitted during TTI at time instant n (i.e. along with TB2 transmission at the current time instant n).

Similarly, cRV6 (i.e. cRV=6) above represents redundancy version for CBGs that satisfy CBG mod 3==0 associated to the current (i.e. n), previous (n−1), and future (n+4) transport block that would be transmitted four subframes later. For example, assuming that three TBs, TB1 (e.g., transmitted at time n−1), TB2 (e.g., transmitted at time instant n) and TB3 (e.g., transmitted at time instant n+4) are considered for encoding, and TB1 comprises three CBGs, $CBG^1_1$, $CBG^1_2$, $CBG^1_3$, TB2 comprises three CBGs, $CBG^2_1$, $CBG^2_2$, $CBG^2_3$, and TB3 comprises three CBGs, $CBG^3_1$, $CBG^3_2$, $CBG^3_3$, cRV6 is generated across RVs generated from CBGs that satisfies CBG mod 3==0. In this example, those CBGs are $CBG^1_3$ of TB1, $CBG^2_3$ of TB2, and $CBG^3_3$ of TB3. Once the cRV6 is generated, the cRV6 is transmitted during TTI for the current TB (i.e. n). In general, code blocks that satisfy CBG mod N==0 (N>0) may be transmitted. There may be an explicit signaling to indicate the redundancy version that should be transmitted or is transmitted, through DCI. Alternately or additionally, there may be implicit signaling where a cRV transmission depends on subframe number/SFN. Some examples are cRV4 sent when ((TTI mod 4==0) && (SFN mod 3==0)), and/or cRV7 sent when (TTI mod 6==0).

Embodiments for cRV decoding with CBGs are described herein. Decoding of cRV using CBGs is similar to decoding of cRV using TBs described in FIG. 10. In this embodiment, it is assumed that one or more TBs are associated with a cross redundancy version. That is, the CBGs of one or more TBs have been used in generating the cRV. Using a cRV to jointly decode CBGs of the TB, proceeds according to the following steps.

The individual redundancy versions of CBGs of a TB may be used to check whether decoding is successful. For example, assuming that $(cRV2)^{12}$ is used to decode all CBGs associated with $TB_1$, $(cRV2)^{12}$ may denote the cross parity of all CBGs associated with $TB_1$, and $TB_2$. The procedure may begin by decoding all CBGs of $TB_1$ using the received individual redundancy versions (e.g., $(RV0)^1$, $(RV2)^1$). If decoding is not successful using the individual redundancy versions, the CBGs of current TB may be stored in a buffer for possible joint decoding with past or future CBGs of other TBs. If decoding is successful, the decoded data may be sent to the upper layers, and a copy may be kept in the buffer as it may possibly be useful for decoding erroneous CBGs of other TBs received in the future.

Figure 13:
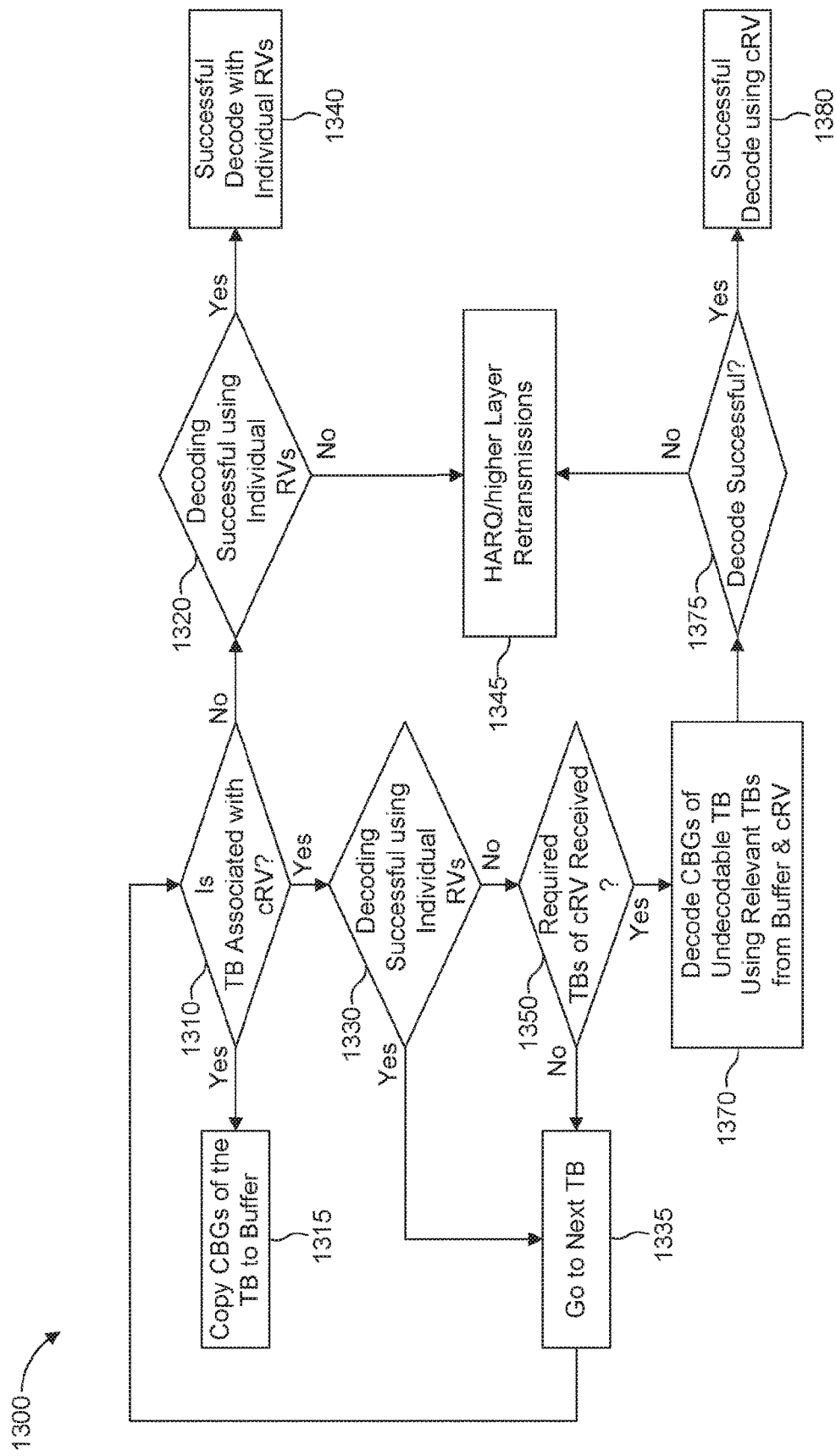
FIG. 13 is a diagram illustrating an example decoding procedure using cRV generated across multiple CBGs.

FIG. 13 illustrates an example decoding procedure 1300 using cross redundancy version (cRV) generated across multiple code block groups (CBGs), which may be used in any combination of other embodiments described herein. As illustrated in FIG. 13, a receiver (e.g., WTRU) may receive a TB and determine whether the TB is associated with cRV generated across multiple CBGs associated with the TB at step 1310. If the TB is associated with the cRV, the receiver may copy the CBGs of the TB in its buffer as step 1315 and decode the TB using individual RVs generated from the multiple CBGs associated with the TB. At step 1330, if the TB is successfully decoded using the individual RVs, the receiver may initiate another decoding procedure for the next TB at step 1335. If the TB is not successfully decoded at step 1330, the receiver may first check whether required TBs of cRV are received or not at step 1350. If the receiver received the required TB, the receiver may decode CBGs of undecodable TB using relevant TBs from buffer and cRV at step 1370. If the TB is successfully decoded at step 1380, the receiver may transmit positive HARQ feedback. If the TB is not successfully decoded, the receiver may send negative HARQ feedback at 1345 for retransmission of the TB or relevant portion of the TB. At step 1310, if the TB is not associated with the cRV, the receiver may first determine whether the TB is successfully decoded using individual RVs at step 1320. If the TB is successfully decoded using the individual RVs at step 1320, the receiver may transmit positive HARQ feedback at step 1340 to indicate that the TB is successfully decoded with the individual RVs. If the TB is not successfully decoded using the individual RVs at step 1320, the receiver may transmit negative HARQ feedback at step 1345 for retransmission of the TB or relevant portion of the TB.

It is noted that that for the case when a TB is not associated with a cross redundancy version, the 'default' mode of operation occurs, where either a HARQ retransmission or higher layer retransmission (e.g., RLC) needs to be performed.

The worst case buffer requirements and the case delay incurred for the proposed scheme are described. The worst case buffer requirements for decoding the current TB that is associated with a cRV may depend on the maximum number of TBs required for decoding the current TB. For the example scenario in Table 4, it may be equal to four times the inverse of the minimum code rate per user. The worst case delay incurred for decoding a TB that is associated with a cRV may depend on the difference between the maximum and minimum TB associated with a particular cRV. For the case when cRV=7 in Table 4, the worst case delay incurred in decoding a TB may be equal to 6 TTIs (i.e. n+5−(n−1)). However, it should be noted that, if the individual RVs (i.e., RVx, where x=0, 1, 2, 3) are sufficient to decode the current TB, there may be no delay incurred in decoding this TB, although this TB may still have to be stored in the buffer because it may be useful in decoding future erroneous TBs.

A cross TB based approach described above might make sense in case of NTN. In a scenario where all bundles of a TB are transmitted in a subframe, and that a cRV depends on at most N TBs, the maximum delay that is introduced due to cRV in decoding a TB may be N subframes. As long as N<<round trip delay (RTT) of NTN (e.g., a reasonable choice of N=2 or 3), delay that is introduced due to cRV (conditioned on successful decoding) is still several orders less than what would be experienced if the MAC or the RLC layer is going to request a re-transmission that would incur at least the NTN propagation delay. Even if decoding is unsuccessful using cRV, the increase in delay incurred due to cRV decoding, as a percentage of NTN RTT may be insignificant.

The aforementioned discussions emphasize how cRV could be used for a HARQ process. It should be noted that the same concepts and embodiments can extended across HARQ processes. Furthermore, the principles described are also applicable to LTE systems where the difference is that Turbo codes are used in LTE, while LDPC are used in NR.

LTE systems provide a one bit feedback on the outcome of HARQ decoding. Although it is in general not possible for the transmitter to take the best action on a one bit feedback, this protocol has been followed partly due to less feedback complexity/overhead.

However, in the case of NTN, retransmissions are costly due to large propagation delays and there is a need to minimize the number of retransmissions. Hence, it may be beneficial if the transmitter is provided information not only on the actual outcome of the decoding operation, but also the decoder state information, as this would help the transmitter to perform intelligent retransmissions. For example, the transmitter may decide to perform the following based on the decoder state information: to decide on the bundle size to be used in the current TTI, and/or to decide the number of parity bits to be transmitted in each RV.

In what follows, a log likelihood ratio feedback that provides an indication of the soft values obtained in the HARQ decoding process is described.

The log-likelihood ratio (also called L-value) of a binary random variable U, may be defined to be:

$$L_U(u) = \log \frac{P_U(u = +1)}{P_U(u = -1)}$$

Here the random variable, U, may represent the information bit that is intended to be decoded. As shown above, when U is equally likely to be +1 or −1, then the log likelihood ratio may become zero. Alternately or additionally, the parameter, $|L_U(u)|$, may be considered in denoting the confidence that the decoded bit is a +1 or −1. That is, if $L_U(u) \gg 0$, then it is possible to say with very high confidence that U=+1, than when $L_U(u)$ is positive, and close to zero. The aposteriori (channel) log-likelihood ratio may be defined to be $$L(u \mid y) = \log \frac{P(u = +1 \mid y)}{P(u = -1 \mid y)}$$

where, u represents the information bit that is to be decoded, and y represents the coded channel outputs (y is a vector). The log likelihood ratio of a transmitted bit (L(û)) can be obtained using the a priori L-value, channel L-value, the extrinsic L-values (through parity bits), or the like.

The following provides some embodiments of the HARQ feedback protocol. $y_i$ represents all bits of all redundancy versions transmitted up and until the $i^{th}$ HARQ re-transmission. L ($û_i$) represents the L-value obtained at the end of the $i^{th}$ HARQ re-transmission. It is noted that L ($û_i$) depends on $L(u|_i)$. The percentage of bits for which the following holds: THR1≤L(û)≤THR2 may be calculated. Typically, THR1, THR2 are close to zero with THR1 being a negative number and THR2 being a positive number. In this example, the idea is to observe that the percentage of bits whose confidence measure $|L(û)|$ is low. Based on the number of bits allocated, feedback the outcome of the HARQ along with the percentage of bits satisfying the above L-value criterion.

For the case when 3 bits are allocated for HARQ feedback, one bit may be used for the decoding outcome (ACK/NACK), and the other 2 bits may be used to indicate the quantized percentage value for which the aforementioned L-value criterion is satisfied. That is, '00' may indicate the percentage (for which the criterion is satisfied) to lie between 10% and 25%; '01' may indicate the percentage to lie between 30% and 50%, and or the like.

Embodiments for DCI format for bundling are described herein. A DCI may indicate the MCS to be used for each of the redundancy versions per transport block for bundling scenarios. It is noted that current systems allow only the same MCS to be used for transmitting all redundancy versions while bundling.

The DCI described herein may indicate the raw MCS (e.g., 5 bits) to be used for every redundancy version, or it may indicate the 'delta_MCS' value for redundancy versions 1,2,3 with respect to redundancy version-0.

In a first embodiment, the DCI may indicate MCS of all redundancy versions with multiple bits (e.g., 5 bits) during bundled transmission. For example, for RV-0, $MCS_1$ may be represented with a first multiple bits (e.g., 5 bits). For RV-1, $MCS_2$ may be represented with a second multiple bits (e.g., 5 bits). For RV-2, $MCS_3$ may be represented with a third multiple bits (e.g., 5 bits). For RV-3, $MCS_4$ may be represented with a fourth multiple bits (e.g., 5 bits). With the example of 5 bits, 32 MCS can be represented for each RVs. $MCS_1$, $MCS_2$, $MCS_3$, $MCS_4$, in this example may be the same or different. The first, second, third, and fourth multiple bits may be the same or different. This first embodiment may provide flexibility in MCS assignment to all redundancy versions.

In a second embodiment, the DCI may indicate the base MCS for RV-0, and a 'delta_MCS' for other redundancy versions such as RV-1, RV-2 and RV-3 with respect to the MCS used for RV-0. For example, for RV-0, base_MCS may be represented with multiple bits (e.g., 5 bits). The base_MCS may have the maximum flexibility for the MCS to be used. For RV-1, delta_MCS$_1$ may be represented with multiple bits (e.g., 2 bits). For RV-2, delta_MCS$_2$ may be represented by multiple bits (e.g., 2 bits). For RV-3, delta_MC$_3$ may be represented with multiple bits (e.g., 2 bits). The second embodiment may provide constraints on MCS assignments for redundancy versions 1, 2, 3 as lesser bits (e.g., 2 bits) are assigned for signaling them compared to redundancy version-0. Compared to the first embodiment where total 20 bits (i.e. 5+5+5+5 bits) are used to express the redundancy versions, the second embodiment may use only 11 bits (i.e. 5+2+2+2 bits) to express the redundancy versions. For example, the actual MCS that would be used for RV-3 transmission in the second embodiment may be 'base_MCS+delta_MC$_3$'. Specifically, only 2 bits (i.e. total four possibilities) may express the redundancy version for MC3 with base_MCS as reference.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for use in a wireless transmit/receive unit (WTRU), the method comprising:
    receiving, from a satellite base station (BS), first downlink control information (DCI) indicating that one or more first redundancy versions (RVs) from a plurality of first RVs are configured for a first transport block (TB), wherein the plurality of first RVs are associated with the first TB;
    receiving, from the satellite BS, the first TB;
    receiving, from the satellite BS, second DCI indicating that one or more second RVs from a plurality of second RVs and at least one cross redundancy version (cRV) are configured for a second TB, wherein the plurality of second RVs are associated with the second TB and the at least one cRV is associated with a plurality of bits from both the first TB and the second TB;
    receiving, from the satellite BS, the second TB; and
    on a condition that the WTRU does not successfully decode at least one of the first TB based on the one or more first RVs or the second TB based on the one or more second RVs, decoding the first TB and second TB jointly based on the at least one cRV.

2. The method of claim 1, further comprising:
    on a condition that the WTRU does not successfully decode the first TB, generating a first estimated TB that includes estimated information bits for the first TB; and
    on a condition that the WTRU does not successfully decode the second TB, generating a second estimated TB that includes estimated information bits for the second TB.

3. The method of claim 2, further comprising:
    on a condition that at least one of the first estimated TB or the second estimated TB is generated, performing at least one of:
    concatenating the first estimated TB and the second TB;
    concatenating the first TB and the second estimated TB; or
    concatenating the first estimated TB and the second estimated TB, to generate a concatenated TB.

4. The method of claim 3, further comprising:
    decoding, based on the at least one cRV, the concatenated TB.

5. The method of claim 4, further comprising:
    transmitting, to the satellite BS, hybrid automatic repeat request (HARQ) feedback, wherein the HARQ feedback is positive on a condition that the WTRU successfully decodes the concatenated TB and the HARQ feedback is negative on a condition that the WTRU does not successfully decode the concatenated TB.

6. The method of claim 1, wherein the plurality of bits associated with the at least one cRV are punctured from bits based on at least one of the plurality of first RVs and bits based on at least one of the plurality of second RVs, using a puncturing ratio selected from a set of allowable puncturing ratios.

7. The method of claim 1, wherein:
    receiving, from the BS, first DCI includes successfully decoding the first DCI; and
    receiving, from the BS, second DCI includes successfully decoding the second DCI.

8. A wireless transmit/receive unit (WTRU) comprising:
    a processor; and
    a transceiver,
    the processor and the transceiver configured to:
        receive, from a satellite base station (BS), first downlink control information (DCI) indicating that one or more first redundancy versions (RVs) from a plurality of first RVs are configured for a first transport block (TB), wherein the plurality of first RVs are associated with the first TB;
        receive, from the satellite BS, the first TB;
        receive, from the satellite BS, second DCI indicating that one or more second RVs from a plurality of second RVs and at least one cross redundancy version (cRV) are configured for a second TB, wherein the plurality of second RVs are associated with the second TB and the at least one cRV is associated with a plurality of bits from both the first TB and the second TB;
        receive, from the satellite BS, the second TB; and
        on a condition that the processor does not successfully decode at least one of the first TB based on the one or more first RVs or the second TB based on the one or more second RVs, decode the first TB and second TB jointly based on the at least one cRV.

9. The WTRU of claim 8, wherein the processor is further configured to:
    on a condition that the processor does not successfully decode the first TB, generate a first estimated TB that includes estimated information bits for the first TB; and
    on a condition that the processor does not successfully decode the second TB, generate a second estimated TB that includes estimated information bits for the second TB.

10. The WTRU of claim 9, wherein the processor is further configured to:
   on a condition that at least one of the first estimated TB or the second estimated TB is generated, perform at least one of:
      concatenate the first estimated TB and the second TB;
      concatenate the first TB and the second estimated TB; or
      concatenate the first estimated TB and the second estimated TB, to generate a concatenated TB.

11. The WTRU of claim 10, wherein the processor is further configured to decode, based on the at least one cRV, the concatenated TB.

12. The WTRU of claim 11, wherein the processor and the transceiver are further configured to transmit, to the satellite BS, hybrid automatic repeat request (HARQ) feedback, wherein the HARQ feedback is positive on a condition that the WTRU successfully decodes the concatenated TB and the HARQ feedback is negative on a condition that the WTRU does not successfully decode the concatenated TB.

13. The WTRU of claim 8, wherein the plurality of bits associated with the at least one cRV are punctured from bits based on at least one of the plurality of first RVs and bits based on at least one of the plurality of second RVs, using a puncturing ratio selected from a set of allowable puncturing ratios.

14. The WTRU of claim 8, wherein:
   the processor and transceiver configured to receive, from the BS, first DCI includes the processor configured to successfully decode the first DCI; and
   the processor and transceiver configured to receive, from the BS, second DCI includes the processor configured to successfully decode the second DCI.

* * * * *